(12) United States Patent
Ugawa et al.

(10) Patent No.: US 10,152,218 B2
(45) Date of Patent: Dec. 11, 2018

(54) OPERATION DEVICE, INFORMATION PROCESSING APPARATUS COMPRISING OPERATION DEVICE, AND OPERATION RECEIVING METHOD FOR INFORMATION PROCESSING APPARATUS

(71) Applicant: Olympus Corporation, Hachioji-shi, Tokyo (JP)

(72) Inventors: Akira Ugawa, Tokyo (JP); Reisuke Osada, Hino (JP)

(73) Assignee: Olympus Corporation, Tokyo (JP)

( * ) Notice: Subject to any disclaimer, the term of this patent is extended or adjusted under 35 U.S.C. 154(b) by 71 days.

(21) Appl. No.: 15/178,383

(22) Filed: Jun. 9, 2016

(65) Prior Publication Data

US 2016/0291833 A1   Oct. 6, 2016

Related U.S. Application Data

(63) Continuation of application No. PCT/JP2015/078531, filed on Oct. 7, 2015.

(30) Foreign Application Priority Data

Oct. 21, 2014   (JP) ................................. 2014-214787
Oct. 31, 2014   (JP) ................................. 2014-223453

(51) Int. Cl.
*G06F 3/0488*   (2013.01)
*G06F 3/041*   (2006.01)
(Continued)

(52) U.S. Cl.
CPC ............ *G06F 3/0488* (2013.01); *G06F 3/041* (2013.01); *G06F 3/0416* (2013.01); *H04N 5/225* (2013.01);
(Continued)

(58) Field of Classification Search
CPC ....... G06F 3/041; G06F 3/0416; G06F 3/0488
See application file for complete search history.

(56) References Cited

U.S. PATENT DOCUMENTS 7,148,704 B2   12/2006 Philipp
8,963,868 B2   2/2015 Nakamura et al.
(Continued)

FOREIGN PATENT DOCUMENTS

JP    2006-252141    9/2006
JP    2010-061299    3/2010
(Continued)

OTHER PUBLICATIONS

English translation of International Preliminary Report on Patentability ("IPRP") to corresponding International Patent Application No. PCT/JP2015/078531.
(Continued)

*Primary Examiner* — Chun-Nan Lin
(74) *Attorney, Agent, or Firm* — John C. Pokotylo; Pokotylo Patent Services

(57) ABSTRACT

An operation device includes a touch panel, a detection unit, and a line drawing determination unit. The touch panel detects a contact position where an object has contacted, and outputs a result of detection. The detection unit detects a trace from a start position of contact to an end position of the contact based on the result of the detection output by the touch panel, and detects a change of an area or a width of the contact of the object with the touch panel from the start position to the end position with time. The line drawing determination unit determines whether a line drawing operation to divide the touch panel by a straight line has been performed based on the trace and the change of the area or the width with time detected by the detection unit.

17 Claims, 38 Drawing Sheets

(51) Int. Cl.
*H04N 5/225* (2006.01)
*H04N 5/232* (2006.01)
*G03B 17/02* (2006.01)

(52) U.S. Cl.
CPC ......... *H04N 5/232* (2013.01); *H04N 5/23216* (2013.01); *H04N 5/23293* (2013.01); *G03B 17/02* (2013.01)

(56) References Cited

U.S. PATENT DOCUMENTS

| 2010/0053107 A1* | 3/2010 | Tsuzaki | G06F 3/0412 345/173 |
| 2011/0157078 A1 | 6/2011 | Miyazawa et al. | |
| 2011/0175831 A1* | 7/2011 | Miyazawa | G06F 3/041 345/173 |
| 2013/0222313 A1* | 8/2013 | Nakamura | G06F 3/04883 345/173 |
| 2014/0176477 A1* | 6/2014 | Nakao | G06F 3/0416 345/173 |
| 2014/0218313 A1 | 8/2014 | Zhang | |
| 2015/0242042 A1* | 8/2015 | Kuge | G06F 3/0412 345/178 |

FOREIGN PATENT DOCUMENTS

| JP | 2011-134271 | 7/2011 |
| JP | 2011-150414 | 8/2011 |
| JP | 2012-070310 | 4/2012 |
| JP | 2014-153850 | 8/2014 |
| WO | WO 2013/161162 | 10/2013 |

OTHER PUBLICATIONS

International Search Report to corresponding International Patent Application No. PCT/JP2015/078531, dated Dec. 28, 2015 (4 pgs.) with translation (4 pgs.).

Written Opinion of the International Searching Authority to corresponding International Patent Application No. PCT/JP2015/078531, dated Dec. 28, 2015 (5 pgs.).

First Office Action to corresponding Japanese Patent Application No. 2016-555170, dated Sep. 5, 2017 (3 pgs.), with translation (2 pgs.).

* cited by examiner

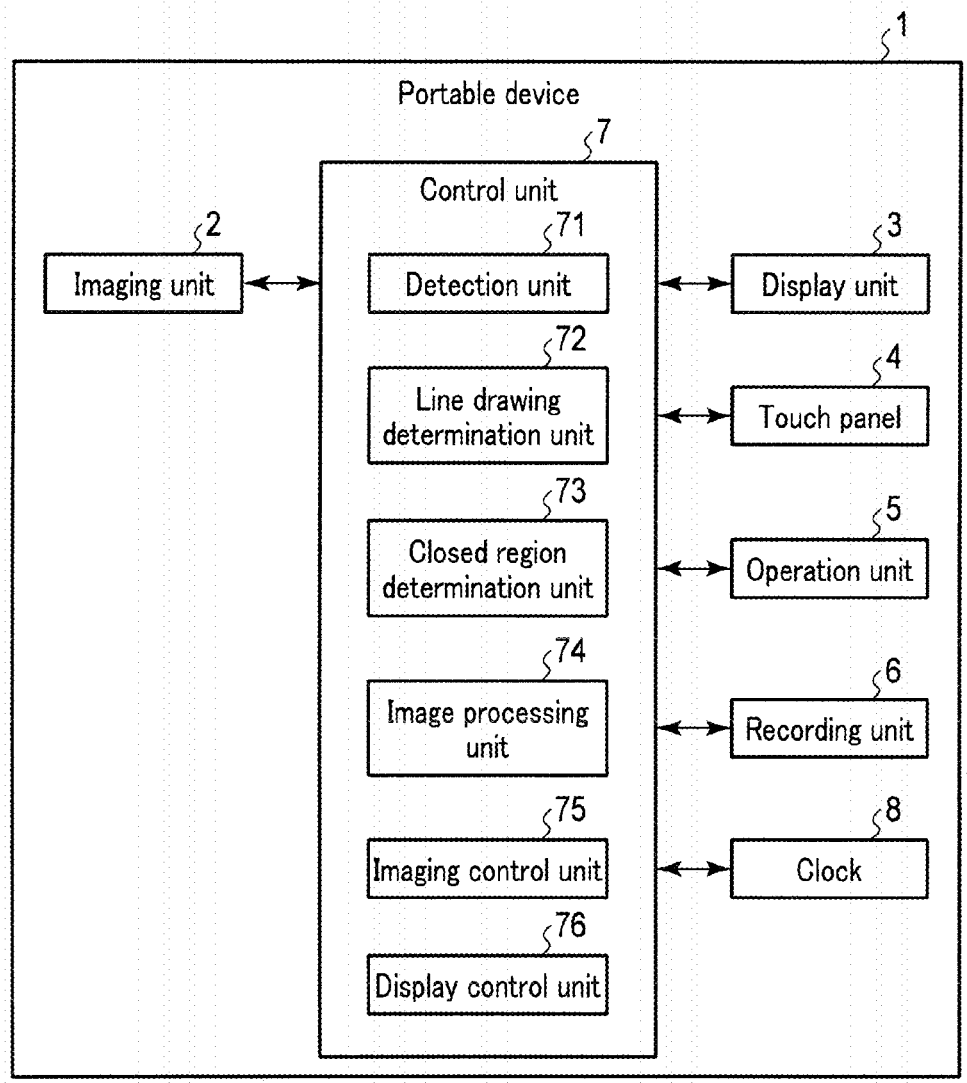
F I G. 1

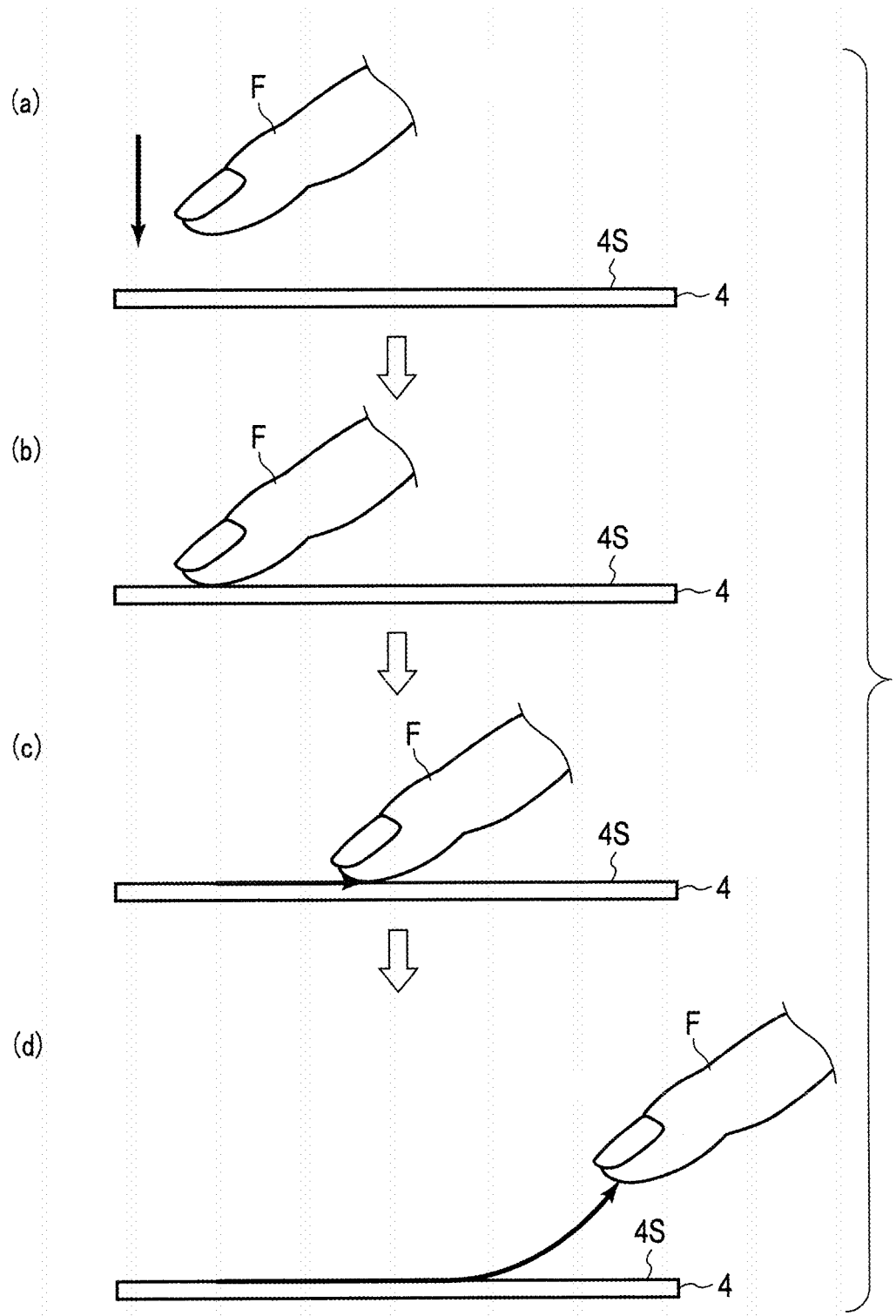
F I G. 9

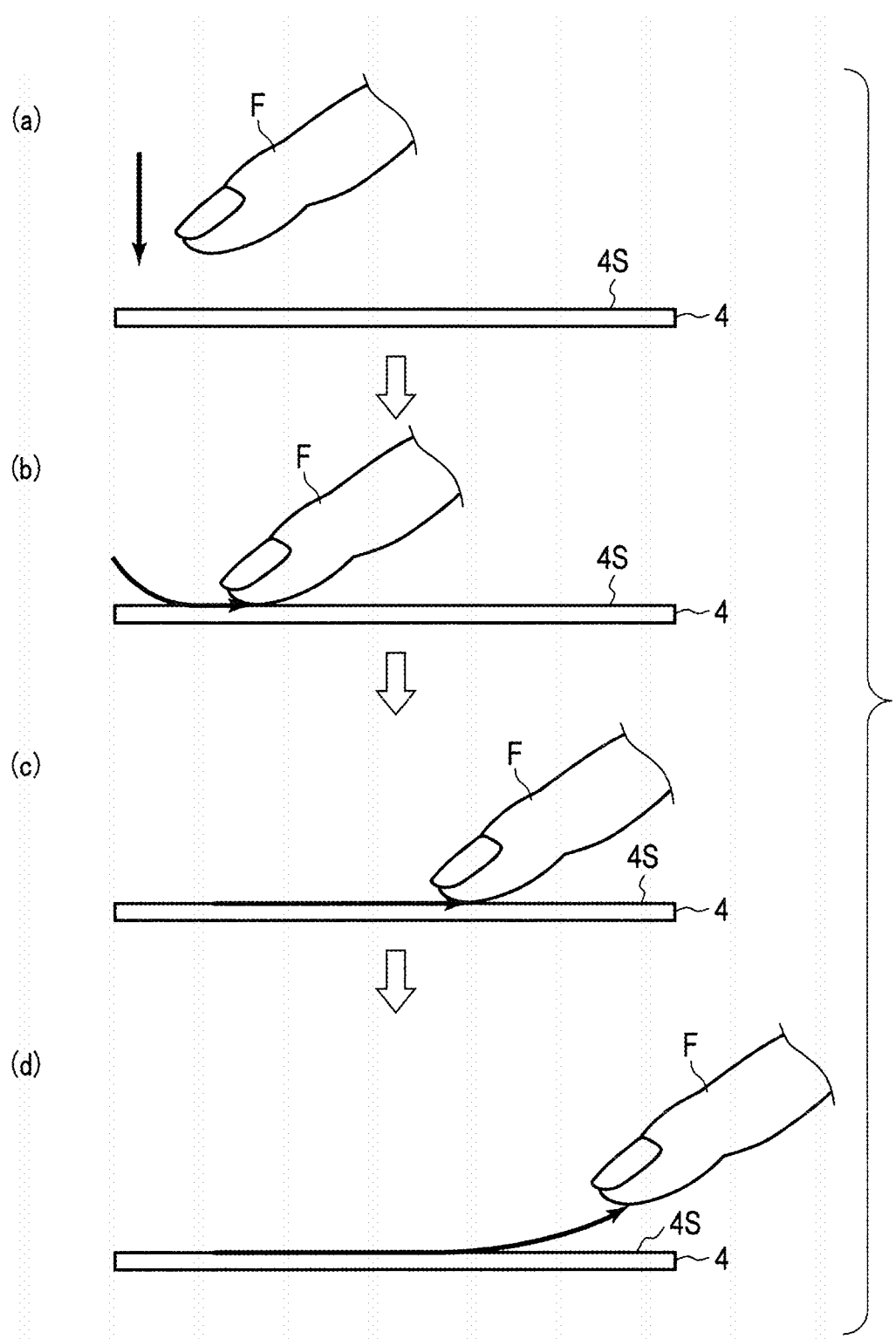
F I G. 10

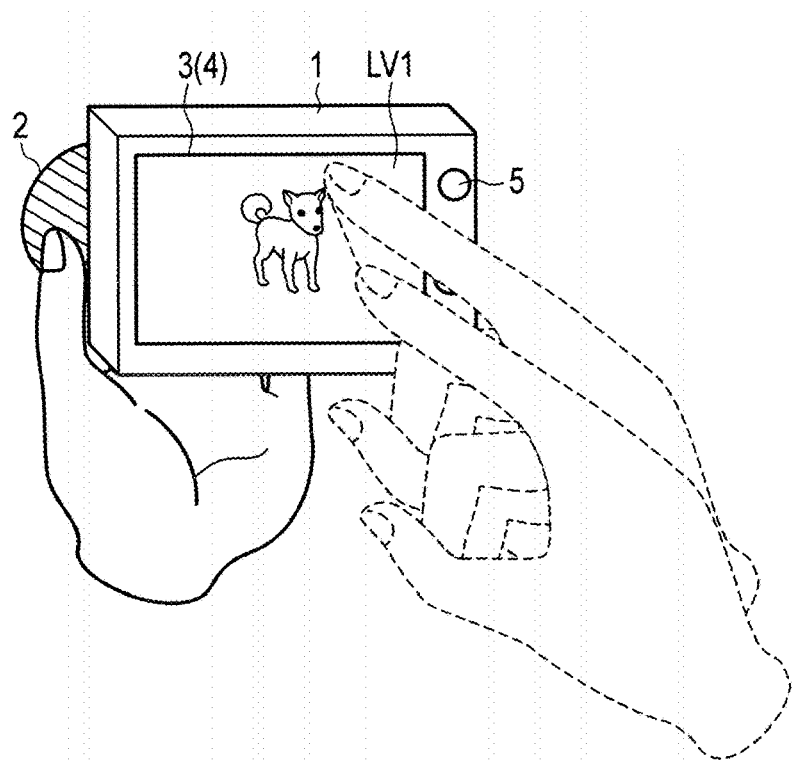
F I G. 16
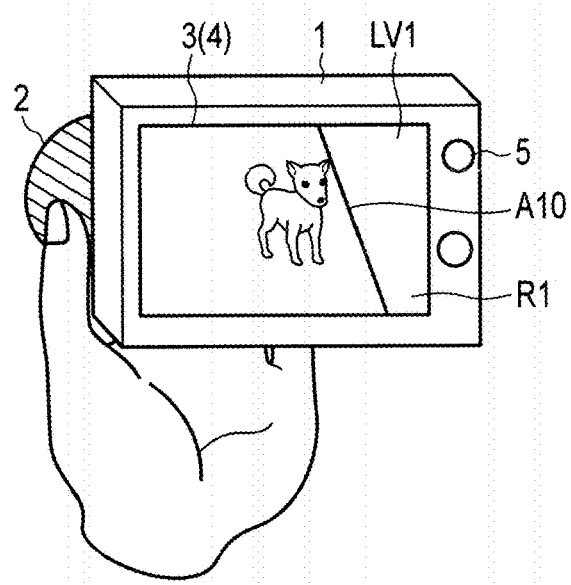
F I G. 17

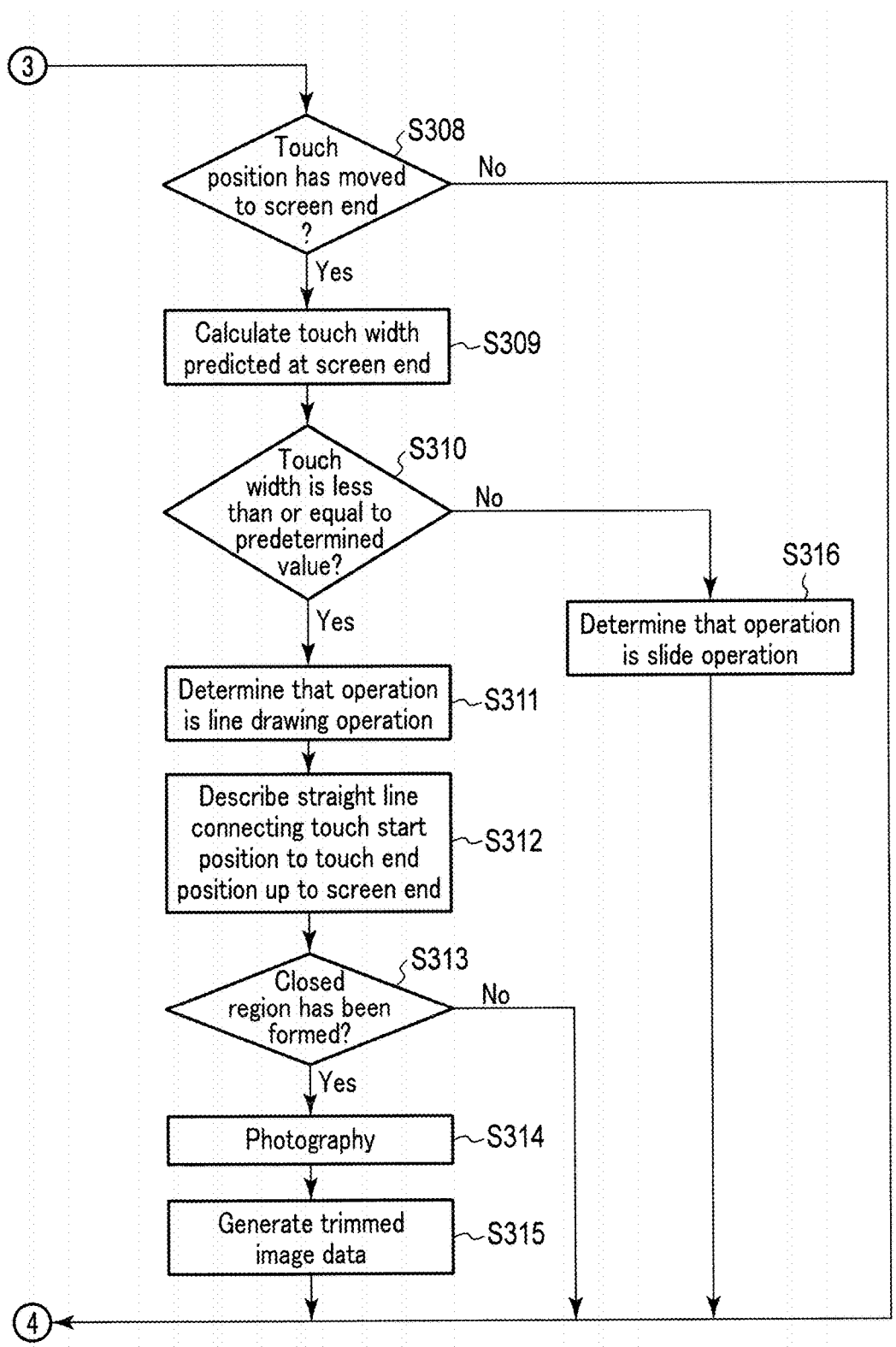
F I G. 19B

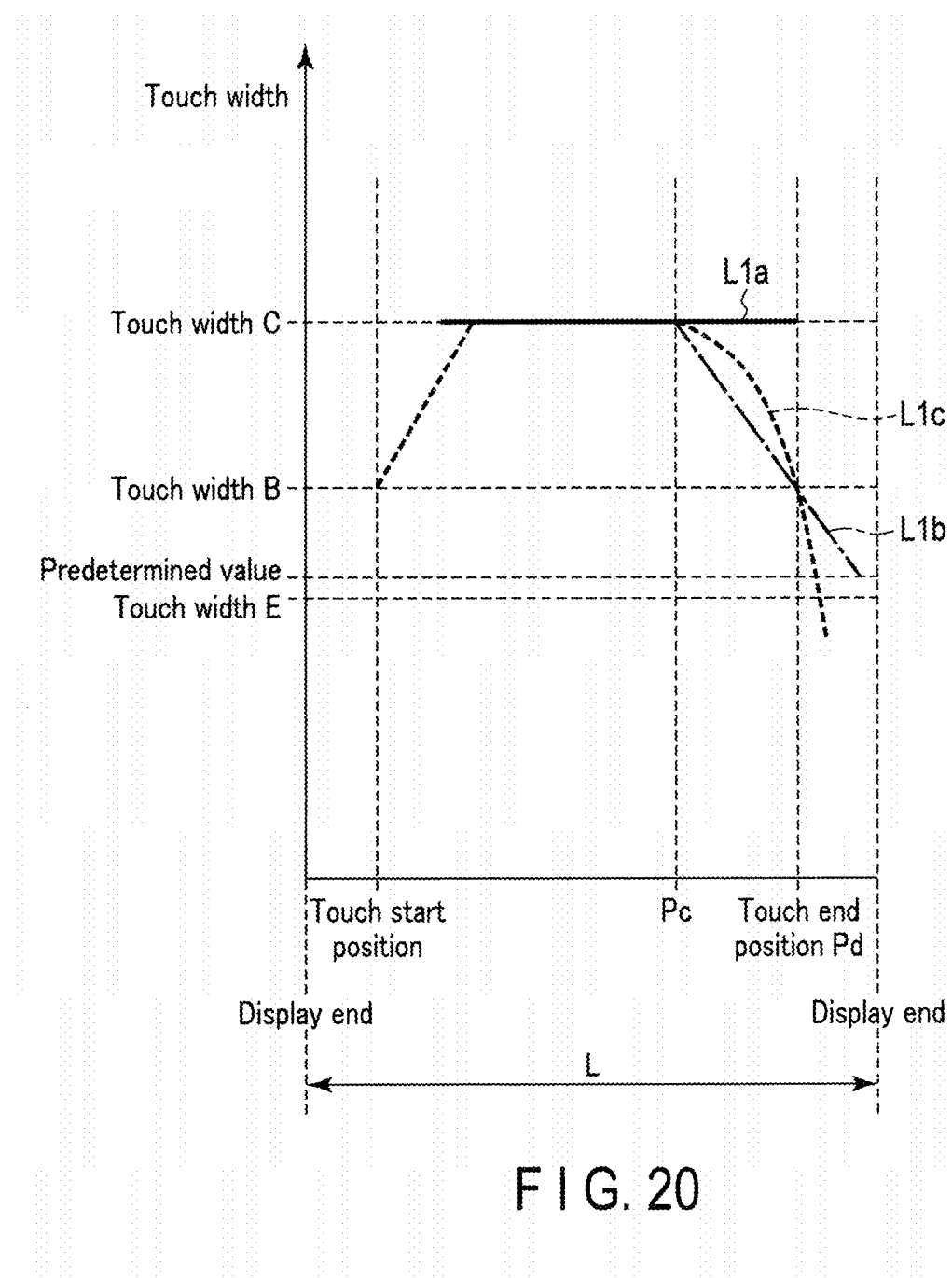
F I G. 20

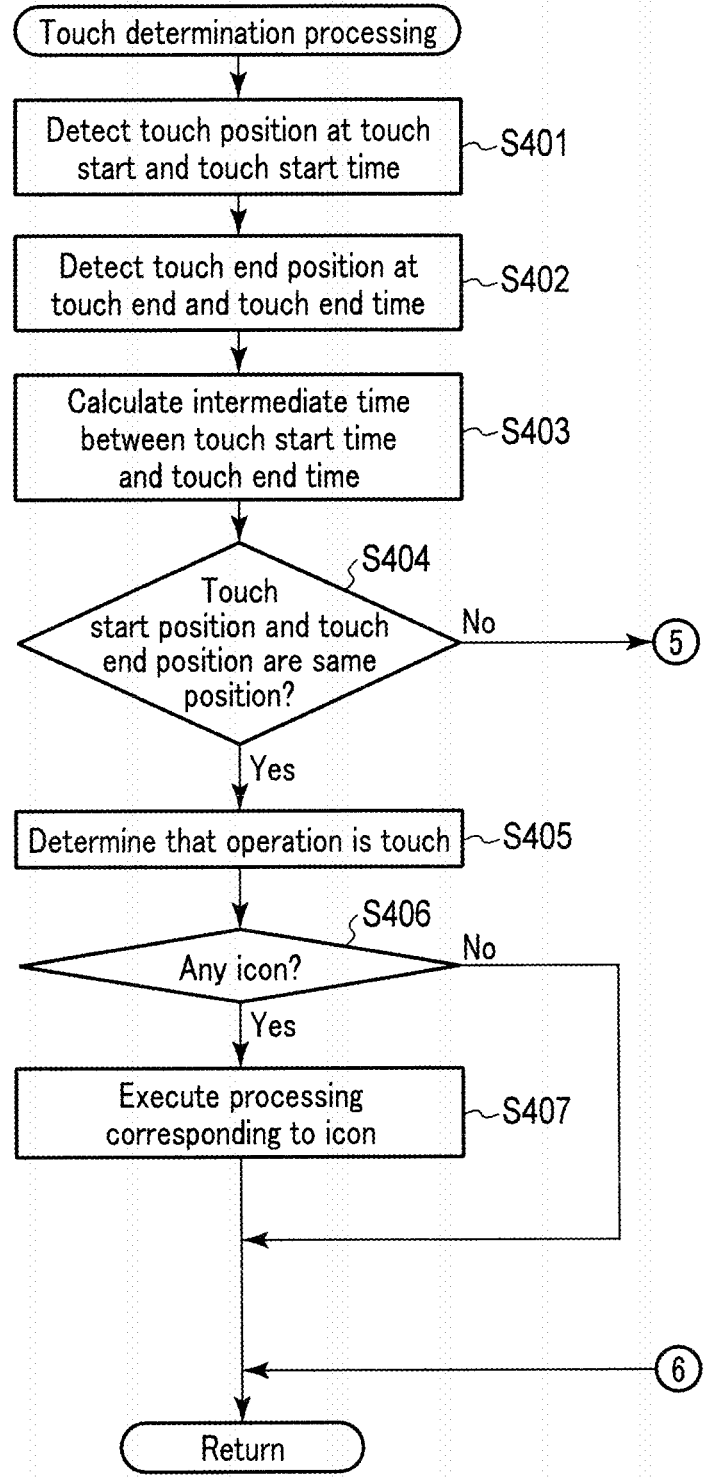
F I G. 21A

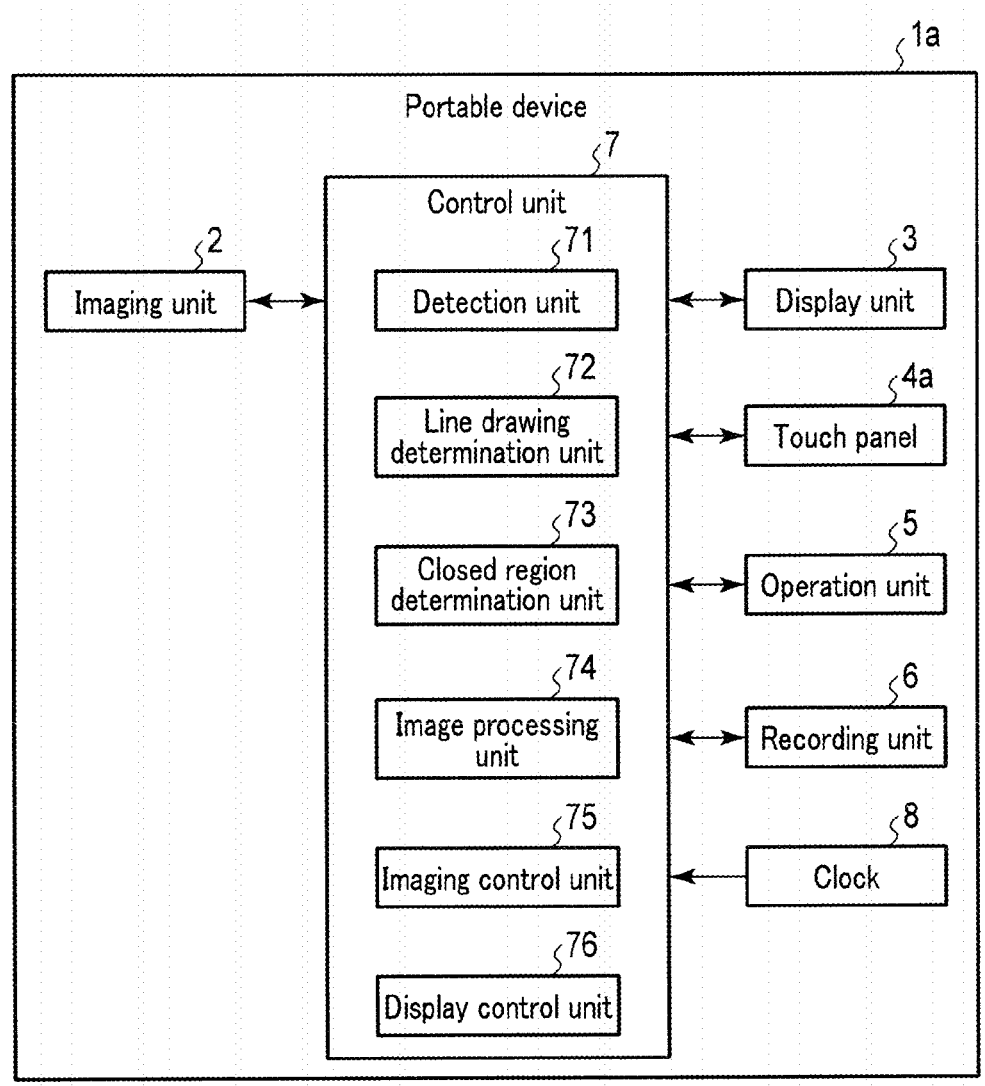
F I G. 23

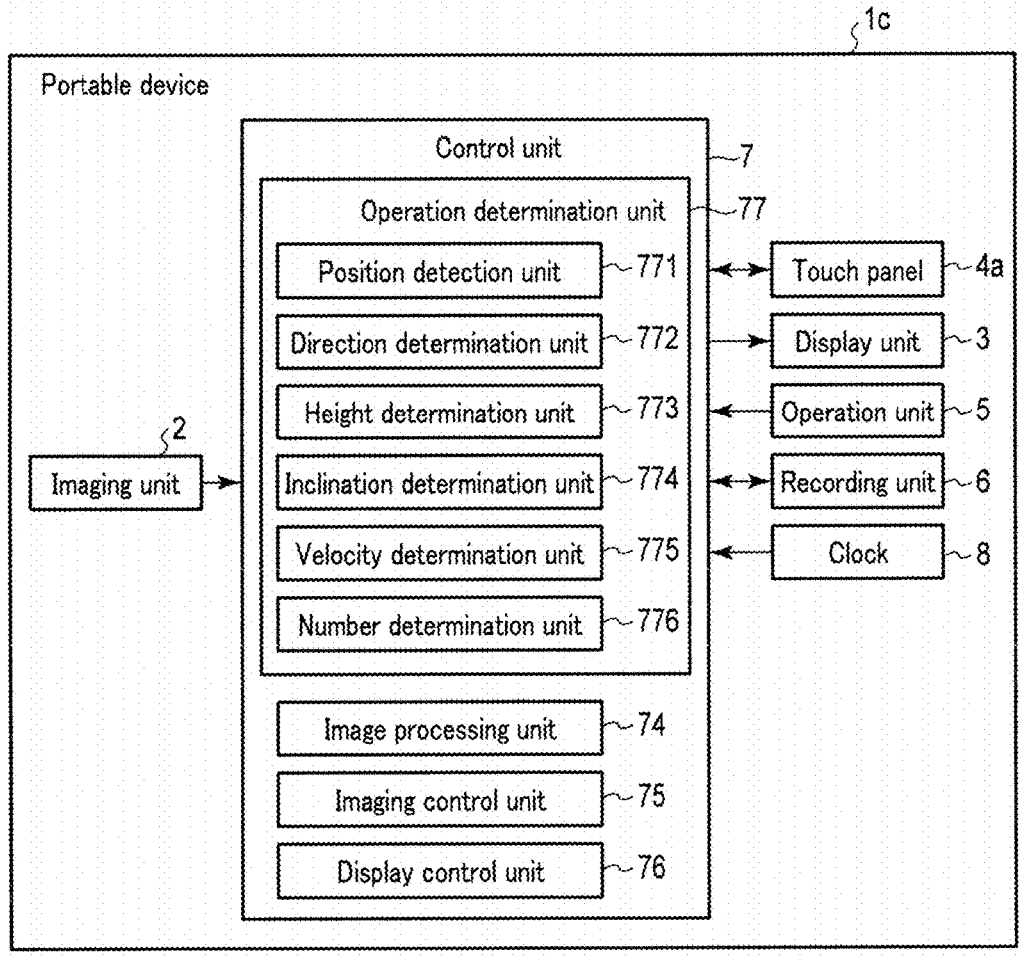
F I G. 28

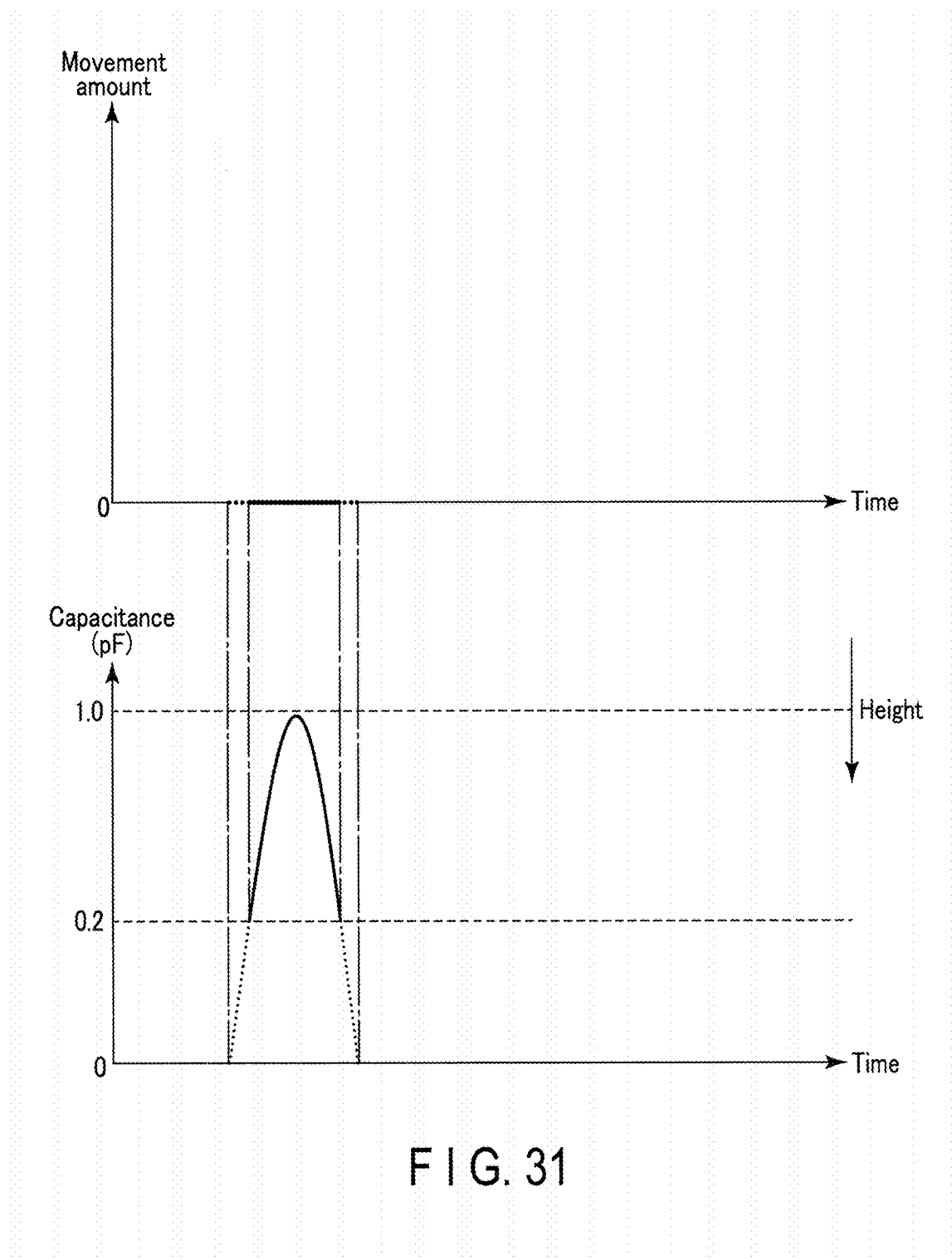
F I G. 31

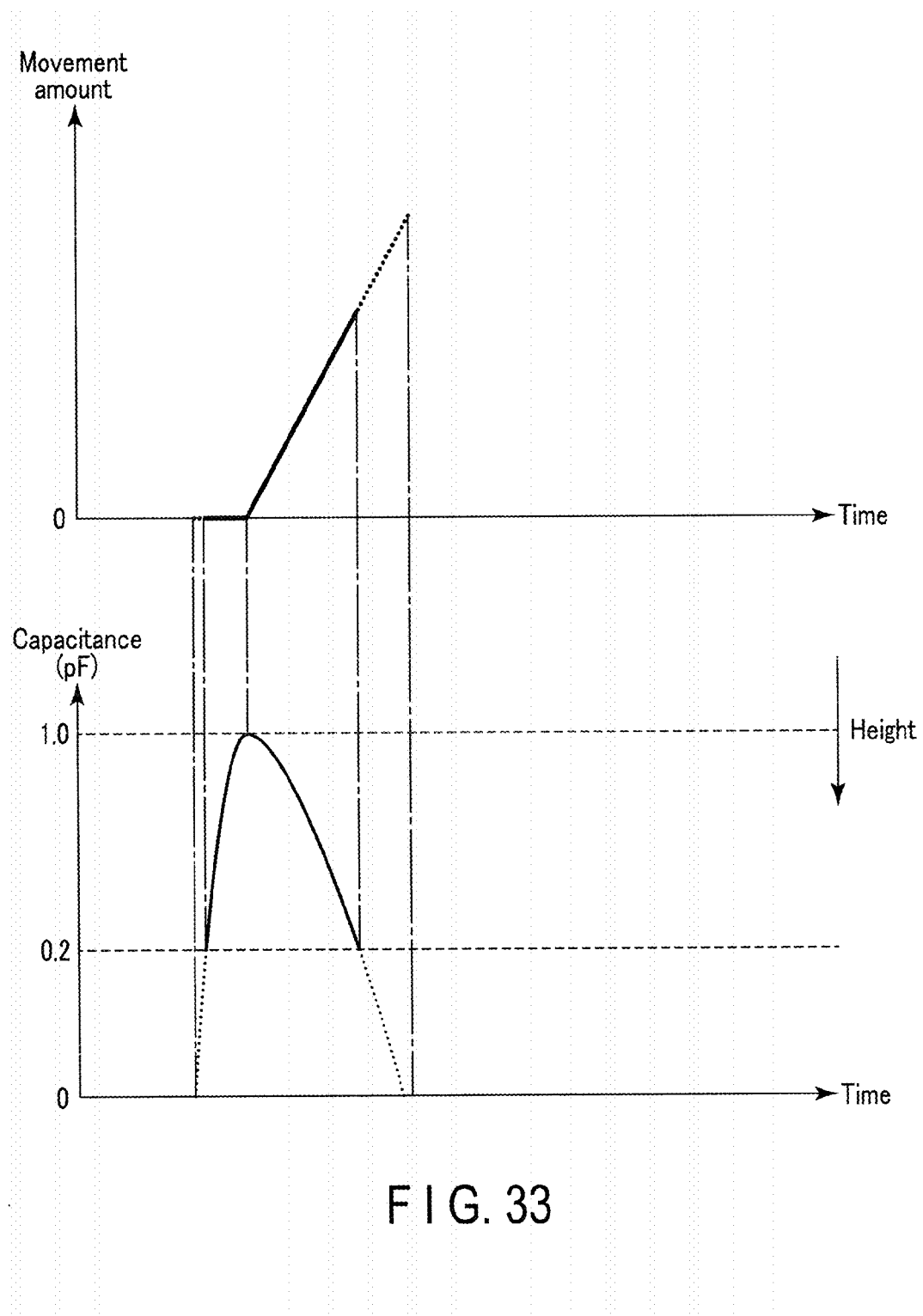
F I G. 33

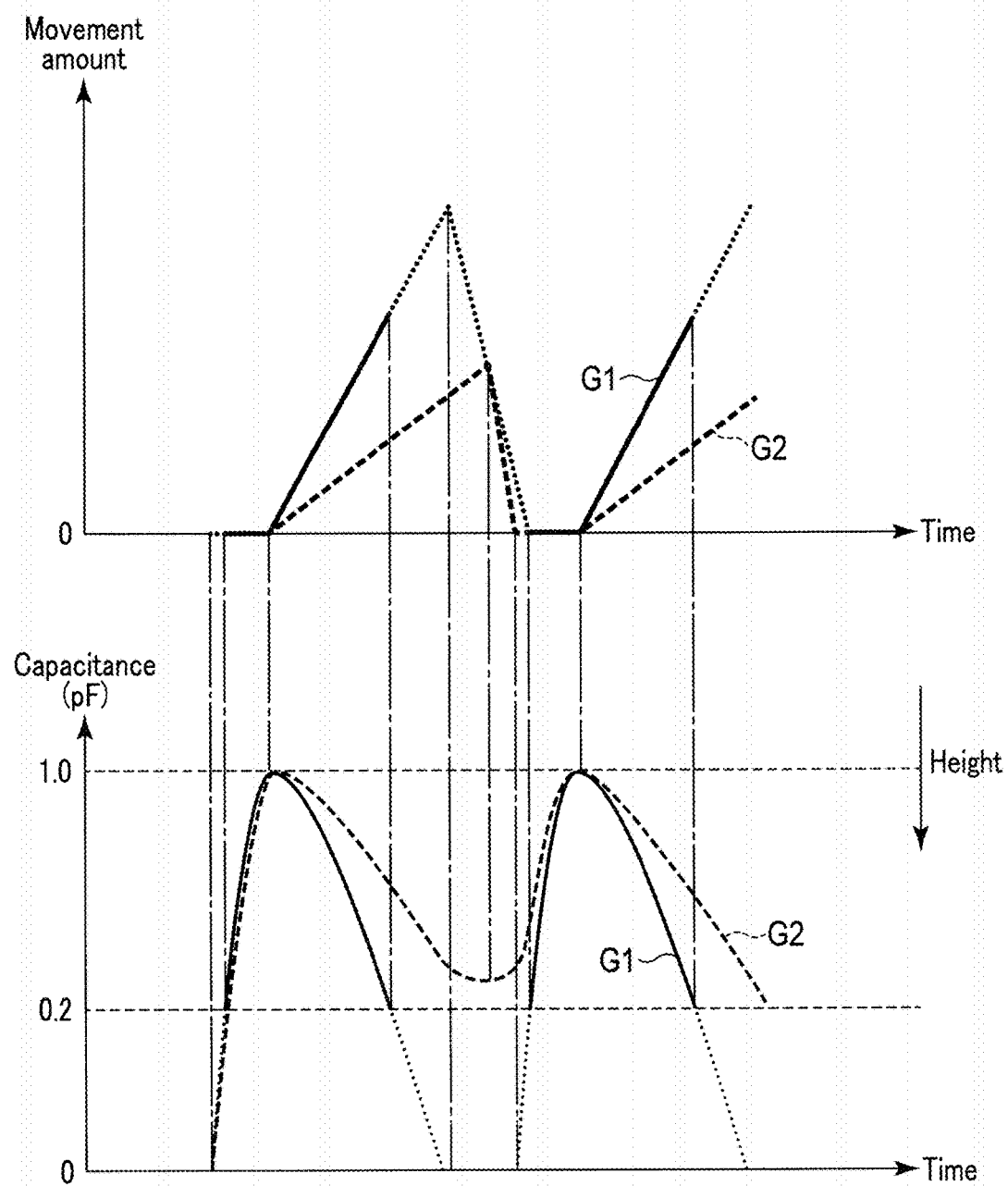
F I G. 34

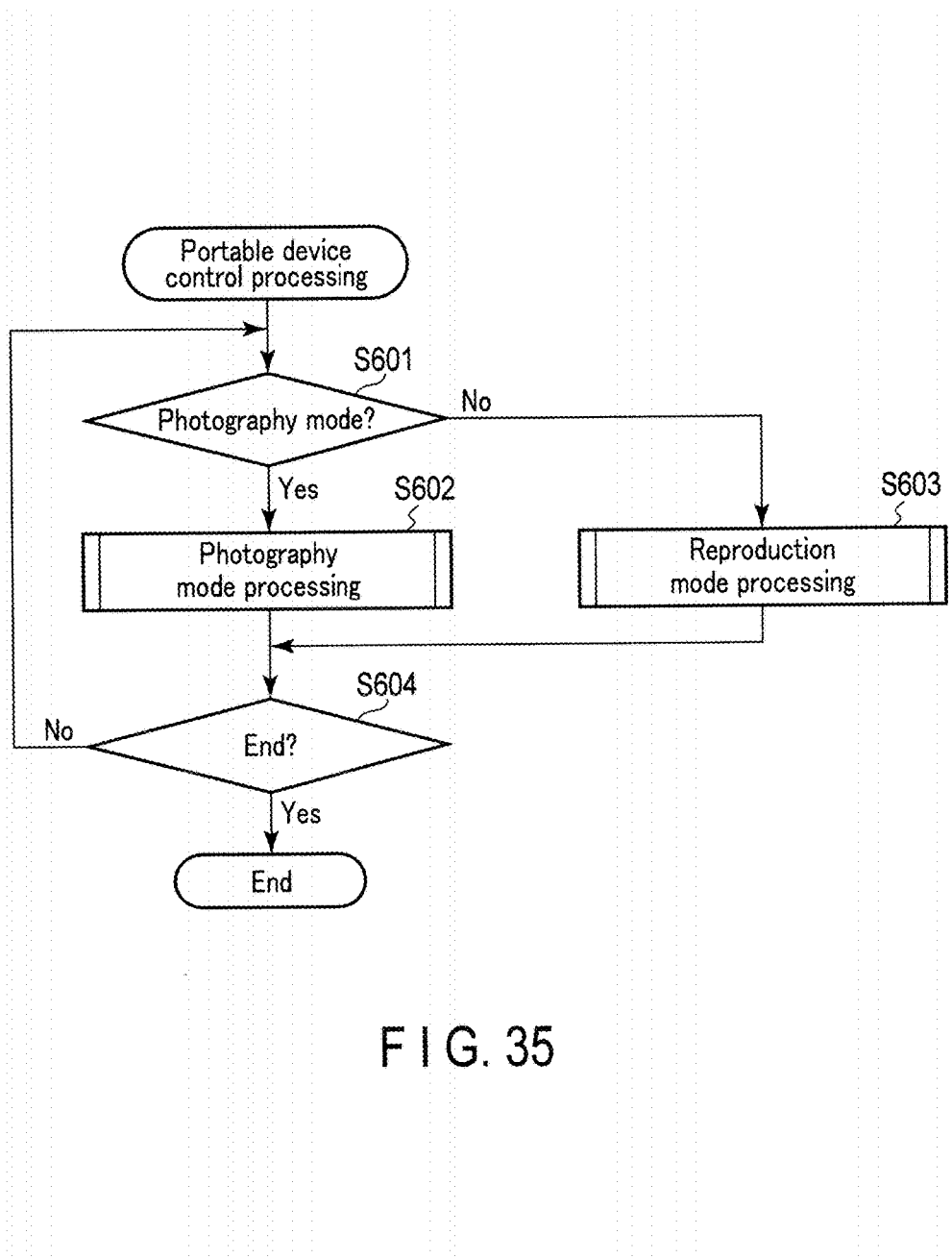
F I G. 35

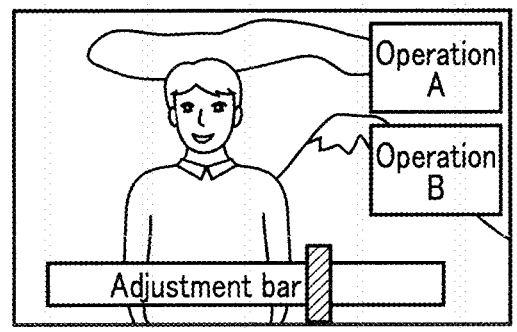
F I G. 38

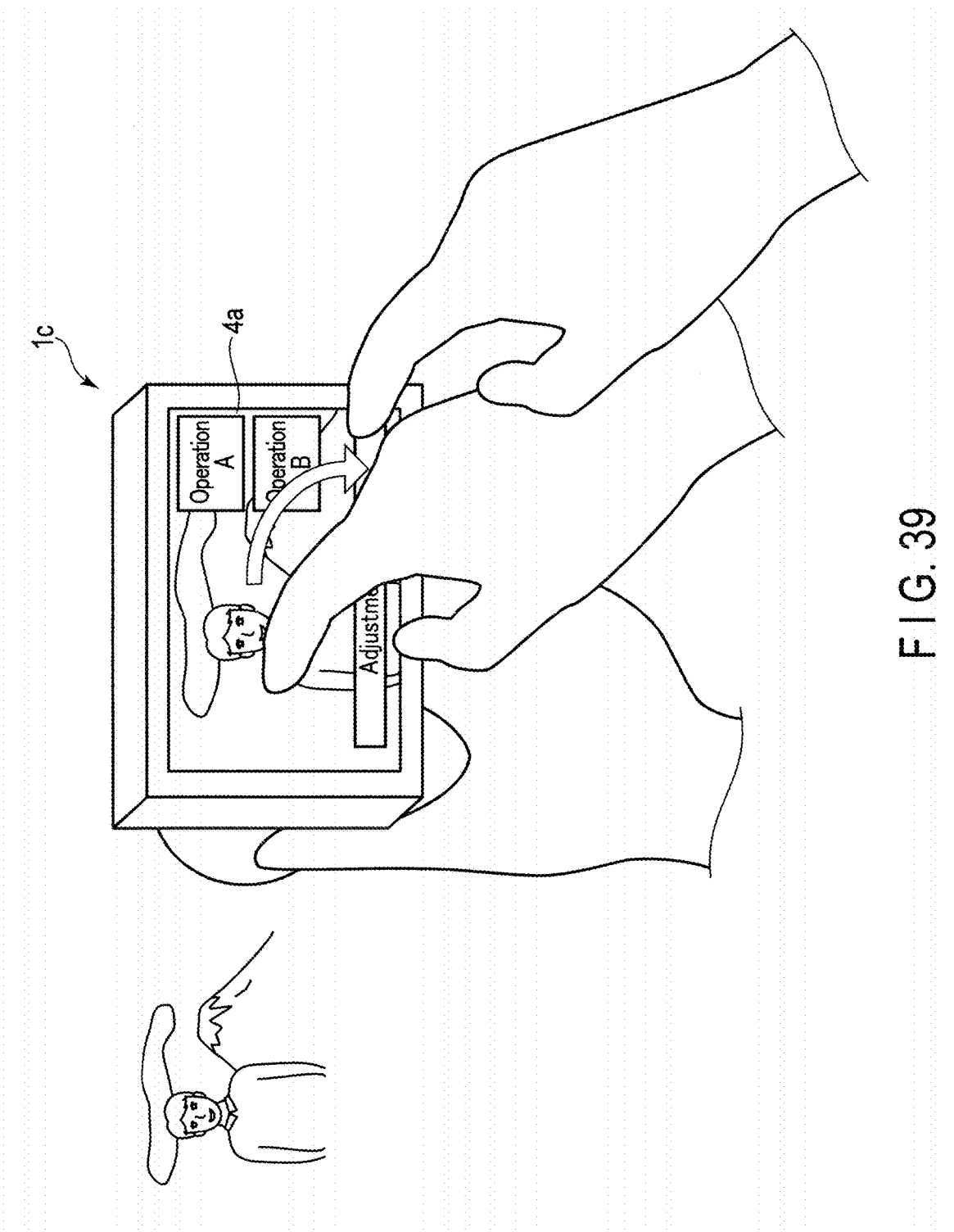
F I G. 39

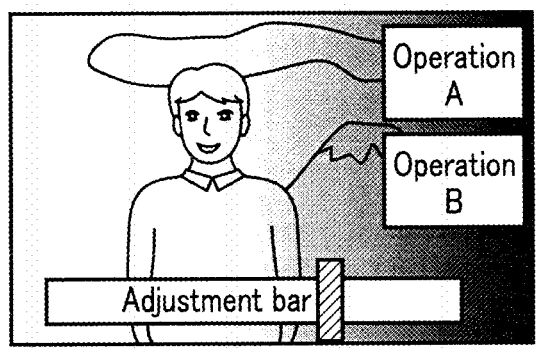
F I G. 40
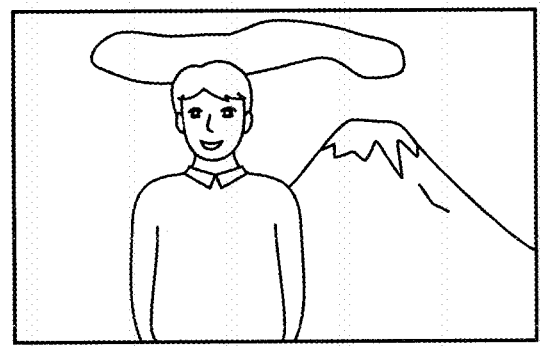
F I G. 41

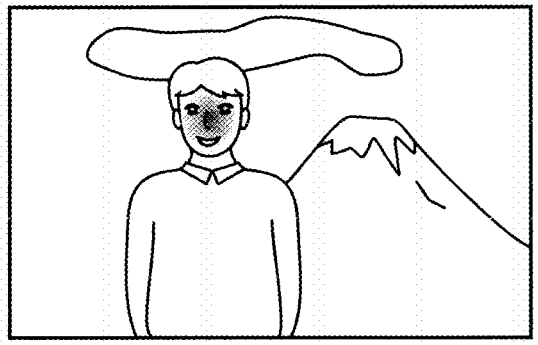
F I G. 42
F I G. 43

OPERATION DEVICE, INFORMATION PROCESSING APPARATUS COMPRISING OPERATION DEVICE, AND OPERATION RECEIVING METHOD FOR INFORMATION PROCESSING APPARATUS

CROSS-REFERENCE TO RELATED APPLICATIONS

This application is a Continuation Application of PCT Application No. PCT/JP2015/078531, filed Oct. 7, 2015 and based upon and claiming the benefit of priority from prior Japanese Patent Application No. 2014-214787, filed Oct. 21, 2014; and No. 2014-223453, filed Oct. 31, 2014, the entire contents of all of which are incorporated herein by reference.

BACKGROUND OF THE INVENTION

1. Field of the Invention

The present invention relates to an operation device, an information processing apparatus comprising an operation device, and an operation receiving method for an information processing apparatus.

2. Description of the Related Art

In general, a touch panel detects the position of, for example, a finger in a detection plane of the touch panel as, for example, a press operation. An operation device having the touch panel determines, for example, a slide operation on the basis of the change of the position detected by the touch panel with time, and outputs the result of this determination. The operation device that uses such a touch panel is provided in a portable terminal device such as a smartphone or in a portable device such as a digital camera. For example, Jpn. Pat. Appln. KOKAI Publication No. 2006-252141 discloses an information input system to display characters or graphics in which lines are changed in thickness in response to a handwriting input when a user performs the handwriting input on a resistive film type touch panel.

That is, Jpn. Pat. Appln. KOKAI Publication No. 2006-252141 discloses a technique to convert an input trace on the touch panel into a calligraphic type and display the calligraphic type. According to this technique, the moving velocity of a position pressed on the touch panel by the user is calculated on the basis of the pressed position on the touch panel detected every predetermined time. The size of a description pattern is changed in response to this moving velocity so that the input trace is converted into the calligraphic type.

There is possibility that the operation by the touch panel may be more important in the future. For example, it is considered that an operation device capable of detecting more kinds of operations by use of the touch panel may be required. For example, more kinds of operations can be detected when the height of a finger from the detection plane of the touch panel can be detected than when the position of the finger in the detection plane can only be detected. If operational information including the change of the height from the detection plane of the touch panel with time can be detected, much more kinds of operations can be detected. If such an operation device capable of acquiring a large number of operations is provided, it is possible to provide a portable terminal device such as a smartphone or a digital camera that adapts to various operations.

The technique according to Jpn. Pat. Appln. KOKAI Publication No. 2006-252141 described above requires, for example, a finger of the user to be correctly in contact with the touch panel. If an operation device which detects an instantaneous action such as a light touch by the user is used, a rapid touch operation can be performed.

BRIEF SUMMARY OF THE INVENTION

According to an aspect of the present invention, an operation device includes a touch panel which detects a contact position where an external object has contacted, and outputs a result of detection; a detection unit which detects a trace from a start position where the object has started to contact the touch panel to an end position where the object has come away from the touch panel based on the result of the detection output by the touch panel, and detects a change of an area or a width of contact of the object with the touch panel from the start position to the end position with time; and a line drawing determination unit which determines whether a line drawing operation to divide the touch panel by a straight line has been performed based on the trace and the change of the area or the width with time detected by the detection unit.

According to an aspect of the present invention, an information processing apparatus includes the operation device; a display unit over which the touch panel is provided and which displays an image; a closed region determination unit which determines whether a closed region has been formed in a display region of the display unit based on results of determinations by the line drawing determination unit; and an image processing unit which trims a region corresponding to the closed region from the image to generate trimmed image data when the closed region determination unit determines that the closed region has been formed.

According to an aspect of the present invention, an operation receiving method is a method for an information processing apparatus including an operation device, the operation device including a touch panel which detects a contact position where an external object has contacted and then outputs a result of detection. The operation receiving method includes detecting a trace from a start position where the object has started to contact the touch panel to an end position where the object has come away from the touch panel based on the result of the detection output by the touch panel; detecting a change of an area or a width of contact of the object with the touch panel from the start position to the end position with time; and determining whether a line drawing operation to divide the touch panel by a straight line has been performed based on the trace and the change of the area or the width with time.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an overview of a functional configuration example of a portable device according to a first embodiment;

FIG. 9 is a diagram schematically showing an example of a first line drawing operation on the touch panel;

FIG. 10 is a diagram schematically showing an example of a second line drawing operation on the touch panel;

FIG. 16 is a diagram schematically showing an example of an image displayed by the display unit;

FIG. 17 is a diagram schematically showing an example of an image displayed by the display unit;

FIG. 19B is a flowchart showing an overview of an example of the touch determination processing executed by the portable device according to the second embodiment;

FIG. 20 is a schematic diagram illustrating a calculation method of the touch width predicted at a screen end of a display region in the display unit calculated by a line drawing determination unit;

FIG. 21A is a flowchart showing an overview of an example of touch determination processing executed by a portable device according to a third embodiment;

FIG. 23 is a block diagram showing an overview of a functional configuration example of a portable device according to a fourth embodiment;

FIG. 28 is a block diagram showing an overview of a functional configuration example of a portable device according to a fifth embodiment;

FIG. 31 is a schematic diagram showing an example of the relation between the movement amount of an in-plane position and the value of capacitance that have been detected with the elapse of time in the touch operation;

FIG. 33 is a schematic diagram showing an example of the relation between the movement amount of an in-plane position and the value of capacitance that have been detected with the elapse of time in the first operation;

FIG. 34 is a schematic diagram showing an example of the relation between the movement amount of an in-plane position and the value of capacitance that have been detected with the elapse of time in the second operation;

FIG. 35 is a flowchart showing an overview of an example of portable device control processing according to the fifth embodiment;

FIG. 38 is a diagram showing an example of an image which is a target of image processing corresponding to the first operation;

FIG. 39 is a diagram illustrating an example of the first operation by the user;

FIG. 40 is a diagram showing display in the case in which the image processing corresponding to the first operation is performed on the image;

FIG. 41 is a diagram showing an example of an image which is a target of image processing corresponding to the second operation;

FIG. 42 is a diagram showing an example of display in the case in which the image processing corresponding to the second operation is performed on the image;

FIG. 43 is a diagram showing another example of display in the case in which the image processing corresponding to the second operation is performed on the image.

DETAILED DESCRIPTION OF THE INVENTION

Figure 2:
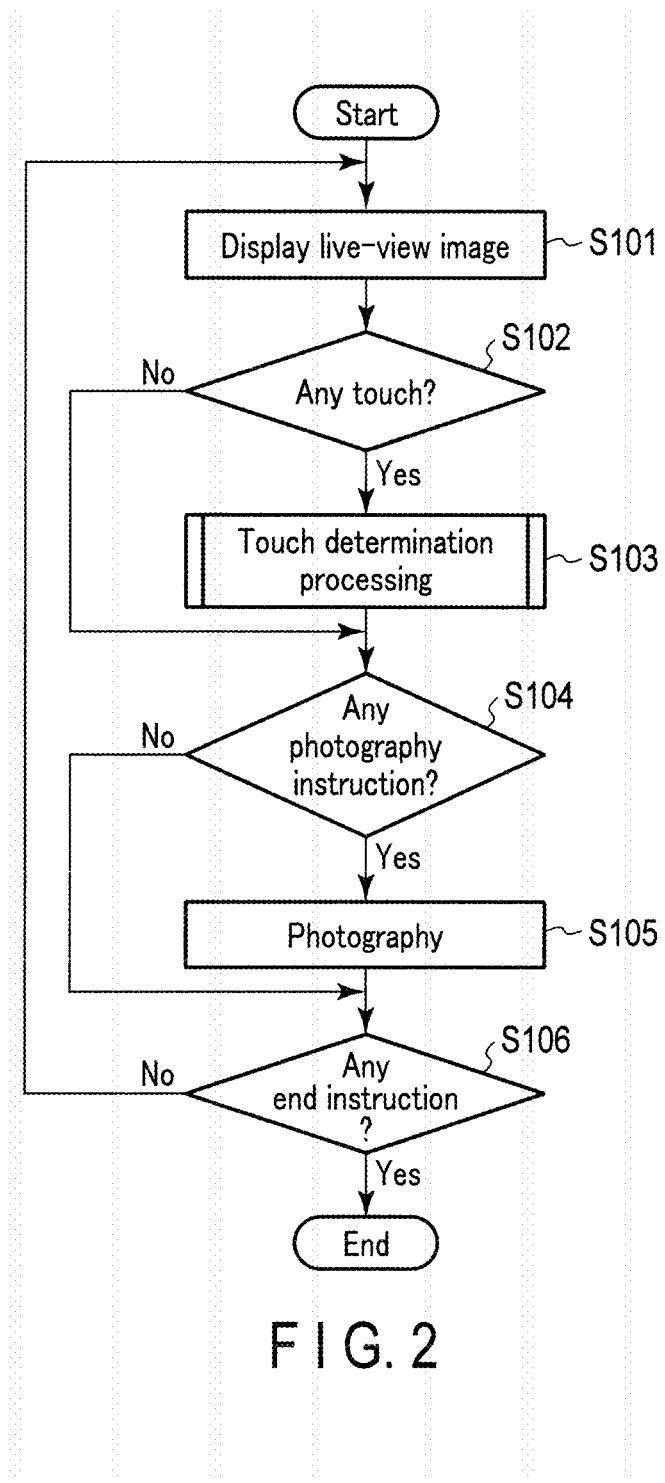
FIG. 2 is a flowchart showing an overview of processing executed by the portable device according to the first embodiment.

Hereinafter, several embodiments of the present invention will be described with reference to the drawings. The present invention is not limited by the following embodiments. Each of the drawings referred to in the following explanation only schematically shows shapes, sizes, and positional relations such that the contents of the present invention can be understood. That is, the present invention is not limited solely to the shapes, sizes, and positional relations illustrated in each of the drawings.

First Embodiment

Configuration of Portable Device

FIG. 1 is a block diagram showing a functional configuration of a portable device according to the first embodiment of the present invention. A portable device 1 shown in FIG. 1 comprises an imaging unit 2, a display unit 3, a touch panel 4, an operation unit 5, a recording unit 6, a control unit 7, and a clock 8.

The imaging unit 2 images a subject, and generates image data regarding this subject. The imaging unit 2 includes lenses, a shutter, a diaphragm, an image pickup device such as a charge coupled device (CCD) image sensor or a complementary metal oxide semiconductor (CMOS) image sensor, an A/D conversion circuit which converts analog image data generated by the image pickup device into digital image data, and a drive unit which drives a focus lens. The imaging unit 2 forms a subject image on an imaging surface of the image pickup device by an optical system, and generates image data based on the subject image. The imaging unit 2 may have a mechanism which detects the distance from the subject. For example, the image pickup device may include phase difference detection pixels to detect a subject distance by a phase difference. The imaging unit 2 images the subject under the control of the control unit 7, and outputs image data regarding this subject to the control unit 7.

The display unit 3 displays an image corresponding to the image data under the control of the control unit 7. The display unit 3 includes a display panel comprising, for example, liquid crystal or organic electro luminescence (EL), and a display drive circuit. The display of images in the display unit 3 includes, for example, check display to display image data immediately after imaging for a predetermined length of time (e.g., for 3 seconds), reproduction display to display reproduction images corresponding to the image data recorded in the recording unit 6, and live-view image display to sequentially display, in time series, live-view images corresponding to image data successively generated by the imaging unit 2. The display unit 3 also suitably displays, for example, operational information for the portable device 1 and information regarding photography.

The touch panel 4 is provided over a display screen of the display unit 3, and detects a contact position (coordinate information) where an external object contacts. The touch panel 4 outputs coordinate information based on this detection result. For example, a resistive film type, a capacitance type, or an optical type may be used as the type of touch panel 4. The touch panel 4 outputs coordinate information for a region including the position where the object has contacted. For example, the touch panel 4 outputs coordinate information for at least two places on the surface of the touch panel 4. Specifically, the touch panel 4 detects multiple pieces of peripheral coordinate information in addition to the coordinate information corresponding to the position where the object has contacted, and outputs these pieces of coordinate information.

The operation unit 5 accepts inputs of various operations regarding the portable device 1. The operation unit 5 receives an instruction input by a user, and transmits this instruction to the control unit 7 as an operational signal. The operation unit 5 includes, for example, an electric power supply switch, a release switch, and a mode changeover switch.

The recording unit 6 records, for example, image data generated by the imaging unit 2, various programs to operate the portable device 1, and various data and parameters used during the execution of the programs. The recording unit 6 is configured by use of recording media such as a flash memory, a synchronous dynamic random access memory (SDRAM), and a memory card.

The control unit 7 includes an integrated circuit such as a central processing unit (CPU), an application specific integrated circuit (ASIC), or a field programmable gate array (FPGA). The control unit 7 may comprise, for example, one integrated circuit or a combination of integrated circuits. The control unit 7 is operated in accordance with the programs recorded in, for example, the recording unit 6 or recording areas of various circuits. The control unit 7 performs overall control of each unit of the portable device 1. The control unit 7 has a detection unit 71, a line drawing determination unit 72, a closed region determination unit 73, an image processing unit 74, an imaging control unit 75, and a display control unit 76.

The detection unit 71 detects the direction of the movement of an object (touch) on the touch panel 4, and a trace from a contact position (start position) where the object has contacted to an end position where the object (touch) has come away from the touch panel 4, on the basis of the detection result output by the touch panel 4. The detection unit 71 also detects the movement of the object from one end to the other end between the ends of the display region of the display unit 3, and detects the behavior of the object at the end position where the object has come away from the touch panel 4. Here, the behavior of the object is detected as the change of the area or width of the contact of the object with the touch panel 4.

The line drawing determination unit 72 determines whether a line drawing operation to divide the screen in the display region of the display unit 3 has been performed on the basis of the trace of the movement of the object detected by the detection unit 71 whenever the detection unit 71 detects the trace of the movement of the object. Specifically, the line drawing determination unit 72 determines whether the line drawing operation has been performed on the basis of the trace of the movement of the object detected by the detection unit 71 and the change of the area or width of the contact of the object with the touch panel 4.

The closed region determination unit 73 determines whether a closed region has been formed in the display region of the display unit 3 on the basis of the determination results by the line drawing determination unit 72. Here, the closed region is a closed region formed in the display region of the display unit 3 by the line drawing operations.

The image processing unit 74 subjects the image data to, for example, a white balance correction, a gamma correction, shading, a noise reduction, and adjustments of brightness and chroma. The image processing unit 74 also performs image processing to change the representation of images, such as enhancement of colors, conversion into black and white, reduction of peripheral light amounts, color formation, and enhancement of contrast. Moreover, when the closed region determination unit 73 determines that the closed region has been formed, the image processing unit 74 trims a region corresponding to the closed region from the image displayed by the display unit 3 to generate trimmed image data.

The imaging control unit 75 controls the operation of the imaging unit 2. The imaging control unit 75 causes the imaging unit 2 to perform photography when the closed region determination unit 73 determines that the closed region has been formed.

The display control unit 76 controls the display form of the display unit 3. The display control unit 76 causes the display unit 3 to display an image corresponding to image data which has been generated by the imaging unit 2 and which has been subjected to the image processing by the image processing unit 74. The display control unit 76 also causes the display unit 3 to display a menu indicating an operational procedure. Moreover, the display control unit 76 causes the display unit 3 to display the trace of the object described by the line drawing operation.

The clock 8 transmits time information to the control unit 7 as a signal. This time information is used, for example, to record the time at which the image has been acquired. This time information may be used to obtain the timing of measuring the change, with time, of the signal detected from the touch panel 4.

(Processing of Portable Device)

The processing executed by the portable device 1 having the above configuration is described. FIG. 2 is a flowchart showing an overview of the processing executed by the portable device 1.

Figure 3:
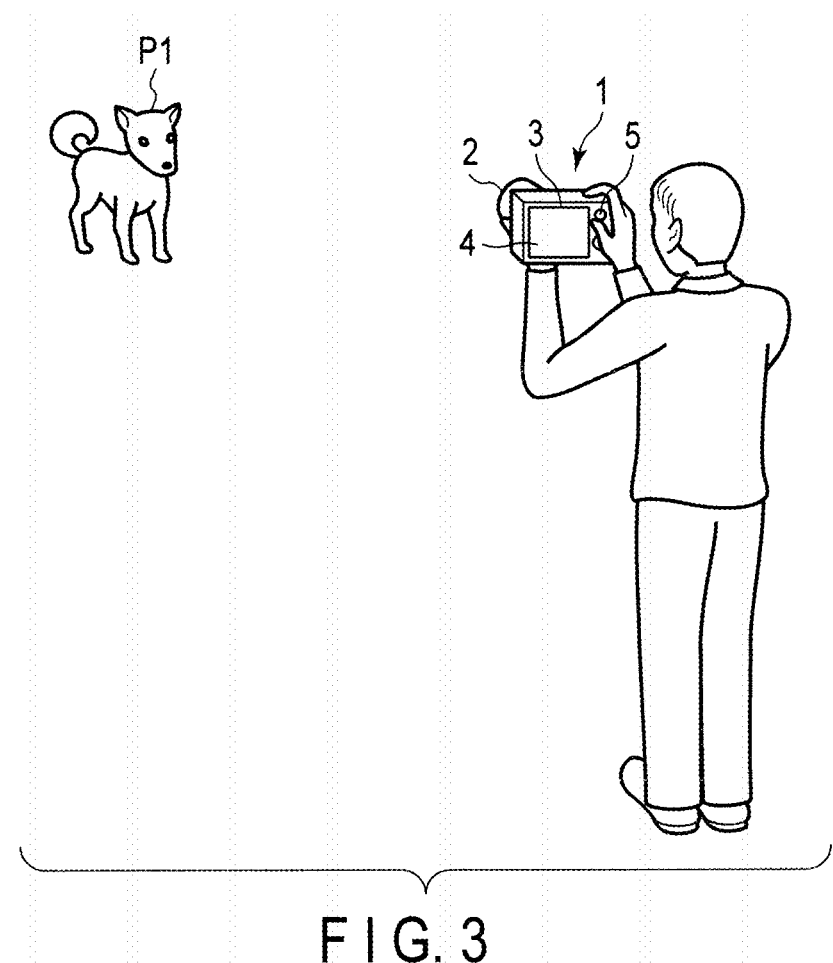
FIG. 3 is a schematic diagram illustrating a situation in which a user photographs a subject by use of the portable device.
Figure 4:
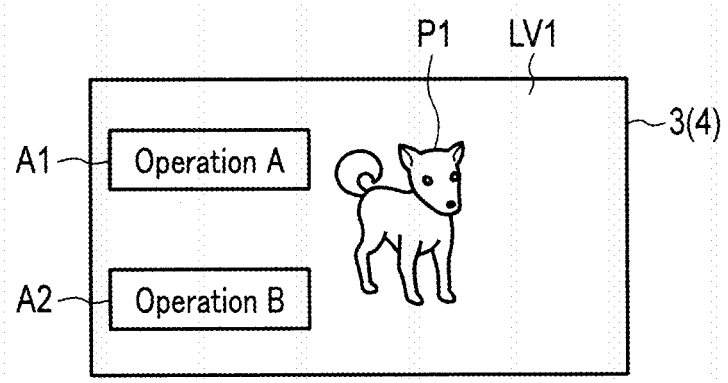
FIG. 4 is a diagram showing an example of a live-view image which is displayed by a display unit of the portable device under the situation in FIG. 3.

In step S101, the display control unit 76 causes the display unit 3 to display a live-view image corresponding to live-view image data successively generated by the imaging unit 2. FIG. 3 is a schematic diagram illustrating a situation in which the user photographs a subject P1 by use of the portable device 1. FIG. 4 is a diagram showing an example of a live-view image which is displayed by the display unit 3 of the portable device 1 under the situation in FIG. 3. As shown in FIG. 3 and FIG. 4, the user decides on a composition of the subject P1 (*dog*) while looking at a live-view image LV1 displayed by the display unit 3 of the portable device 1. In this case, the display control unit 76 displays an operation icon A1 and an operation icon A2 to accept instructions for various operations of the portable device 1 over the live-view image LV1.

In step S102, whether the detection unit 71 has detected a touch on the touch panel 4 is determined. When the detection unit 71 has detected a touch on the touch panel 4 (step S102: yes), the processing proceeds to step S103. In step S103, the portable device 1 executes touch determination processing to accept an operation corresponding to the touch. Details of the touch determination processing will be described later. After step S103, the processing proceeds to step S104.

When the detection unit 71 has not detected a touch on the touch panel 4 in step S102 (step S102: no), the processing proceeds to step S104.

In step S104, whether a photography instruction has been issued from the operation unit 5 is determined. When a photography instruction has been issued from the operation unit 5 (step S104: yes), the processing proceeds to step S105. In step S105, the imaging control unit 75 causes the imaging unit 2 to perform photography. After step S105, the processing proceeds to step S106.

When no photography instruction has been issued from the operation unit 5 in step S104 (step S104: no), the processing proceeds to step S106.

In step S106, whether an instruction to end photography has been issued from the operation unit 5 is determined. When an instruction to end has been issued (step S106: yes), the present processing is ended. In contrast, when no instruction to end has been issued (step S106: no), the processing returns to step S101.

(Touch Determination Processing)

Figure 5A:
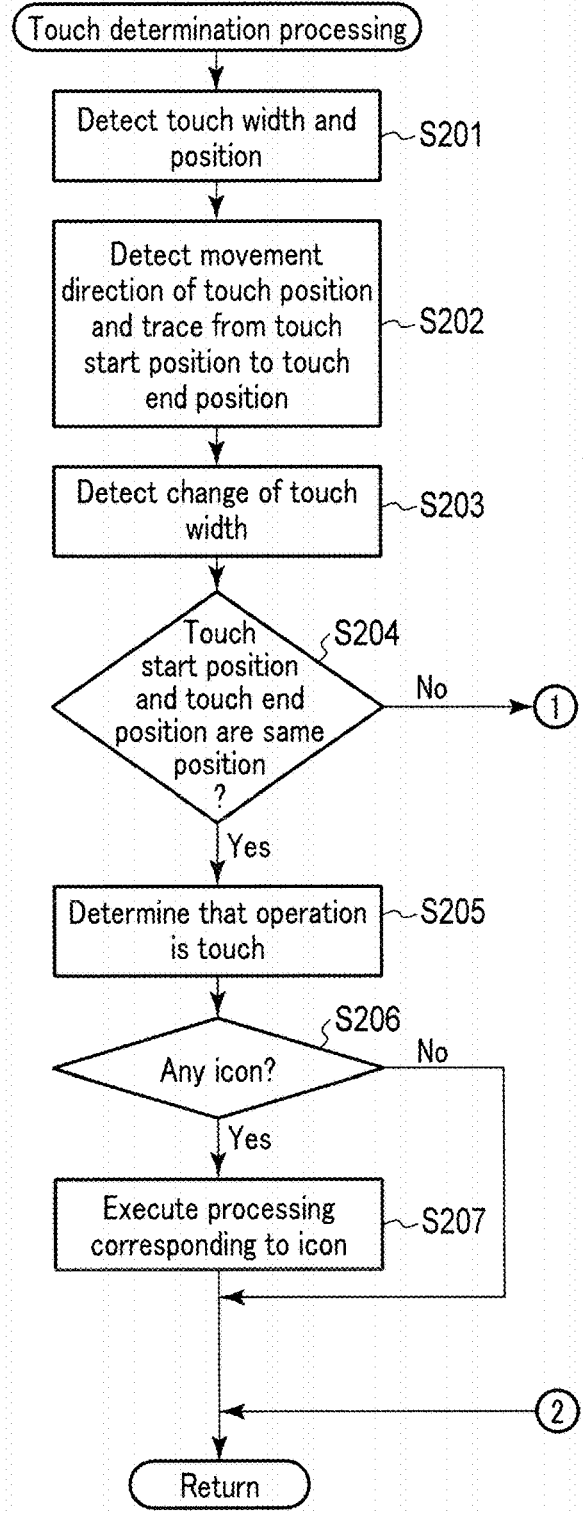
FIG. 5A is a flowchart showing an overview of an example of touch determination processing.
Figure 5B:
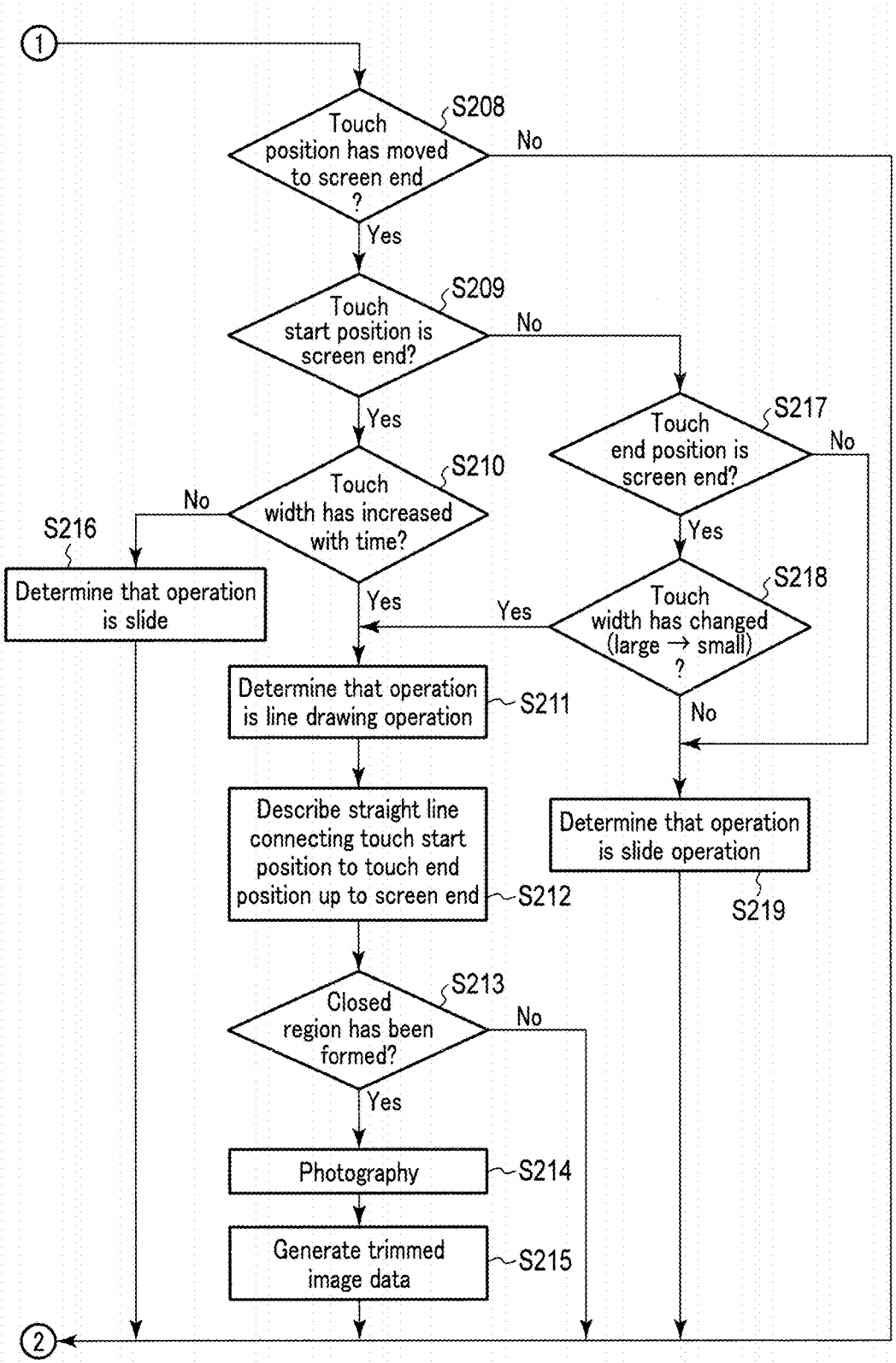
FIG. 5B is a flowchart showing an overview of an example of the touch determination processing.

Next, the above-mentioned touch determination processing in step S103 is described. FIG. 5A and FIG. 5B are flowcharts showing an overview of the touch determination processing.

In step S201, the detection unit 71 detects a touch width from a touch start position to a touch end position, and a touch position, on the basis of a position signal input from the touch panel 4. Here, the touch start position is the position where the finger of the user which is an example of an object has touched the touch panel 4 for the first time. The touch end position is the position where the finger of the user has come away from the touch panel 4. In step S202, the detection unit 71 detects the movement direction of the touch position on the touch panel 4 and a trace from the touch start position to the touch end position.

In step S203, the detection unit 71 detects the change in touch width from the touch start position to the touch end position on the basis of the detection results in step S201 and step S202.

In step S204, the line drawing determination unit 72 determines whether the touch start position and the touch end position on the touch panel 4 are the same position on the basis of the result of detection by the detection unit 71. When the touch start position and the touch end position are the same position (step S204: yes), the processing proceeds to step S205. In step S205, the line drawing determination unit 72 determines that the detected operation is a touch operation.

Figure 6:
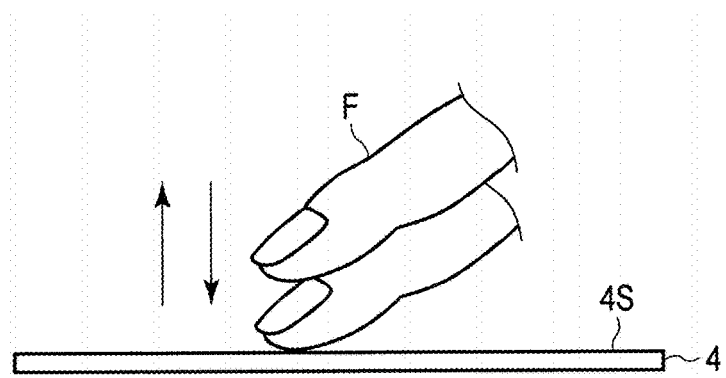
FIG. 6 is a diagram schematically showing an example of a touch operation on a touch panel.

FIG. 6 is a diagram schematically showing a touch operation on the touch panel 4. As shown in FIG. 6, the touch operation is an operation in which the user perpendicularly brings a detection object F that is, for example, a finger closer to a detection plane 4S of the touch panel 4 and then perpendicularly brings the detection object away from the detection plane. The direction in which the detection object is brought closer or away does not need to be strictly perpendicular. The degree of inclination to be permitted is suitably adjusted by a setting parameter.

In step S206, whether there is any icon indicating the operation of the portable device 1 on the live-view image corresponding to the touch position detected by the detection unit 71 is determined. When there is an icon indicating the operation of the portable device 1 (step S206: yes), the processing proceeds to step S207. In step S207, the imaging control unit 75 executes processing corresponding to the icon. For example, when an icon to receive the input of an instruction signal to change the aperture value of the imaging unit 2 is touched, the imaging control unit 75 changes the aperture value of the imaging unit 2. After step S207, the processing returns to the main routine shown in FIG. 2.

When it is determined in step S206 that there is no icon indicating the operation of the portable device 1 on the live-view image corresponding to the touch position (step S206: no), the processing returns to the main routine shown in FIG. 2.

When it is determined in step S204 that the touch start position and the touch end position are not the same position (step S204: no), the processing proceeds to step S208.

Figure 7:
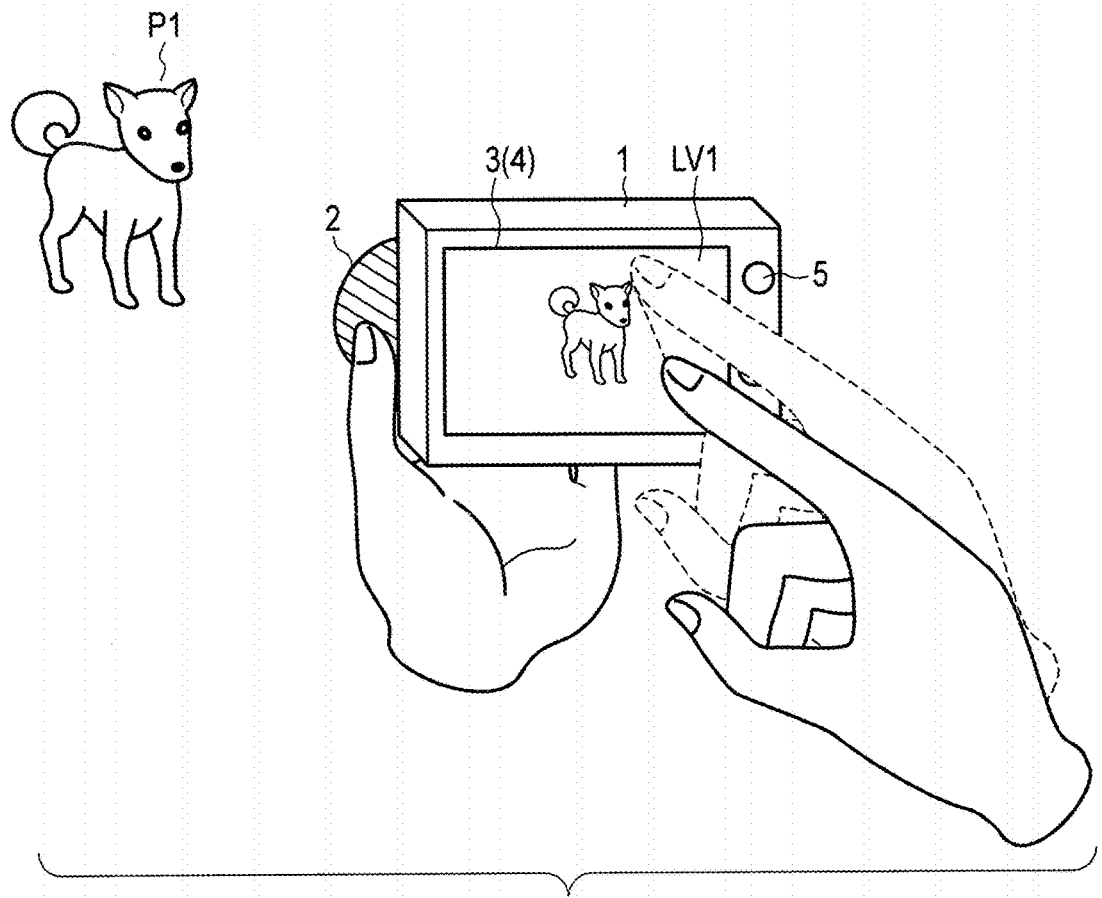
FIG. 7 is a diagram schematically showing an example of a line drawing operation.

In step S208, the line drawing determination unit 72 determines whether the touch position has moved from the touch start position to a screen end on the basis of the results of detection by the detection unit 71 in steps S201 to S203. Specifically, for example, as shown in FIG. 7, the line drawing determination unit 72 determines that the user has moved the finger toward a screen end of the touch panel 4 when the user is moving the touch position to a screen end at an angle to the bottom of the display unit 3. When it is determined that the user has moved the touch position toward the screen end of the touch panel 4 (step S208: yes), the processing proceeds to step S209. In contrast, when it is determined that the user has not moved the touch position toward the screen end of the touch panel 4 (step S208: no), the processing returns to the main routine shown in FIG. 2.

In step S209, the line drawing determination unit 72 determines whether the touch start position is at the screen end of the display region in the display unit 3 on the basis of the results of detection by the detection unit 71 in steps S201 to S203. Here, the screen end does not need to be the edge of the display region in the display unit 3, and includes a place located in the vicinity of the edge of the display region. Specifically, the line drawing determination unit 72 divides the display region in the display unit 3 at predetermined intervals, and determines that a divided region including the screen end in the display region is a screen end. For example, when the display region in the display unit 3 is divided into 5 parts in each of the longitudinal and lateral directions, the divided regions located at the upper, lower, left, and right ends are determined to be screen ends. The screen end of the display unit 3 means the end of the touch panel 4 provided on the display unit 3. When it is determined that the touch start position is at the screen end of the display region in the display unit 3 (step S209: yes), the processing proceeds to step S210.

In step S210, the line drawing determination unit 72 determines whether the touch width has increased with time during the movement from the touch start position to the touch end position on the basis of the result of detection by the detection unit 71. When the touch width has increased with time (step S210: yes), the processing proceeds to step S211. In step S211, the line drawing determination unit 72 determines that the movement from the touch start position to the touch end position is a line drawing operation. Here, the line drawing operation is an operation to divide the display region of the display unit 3 into screens. That is, the line drawing operation is an operation to divide the detection region of the touch panel 4.

Figure 8:
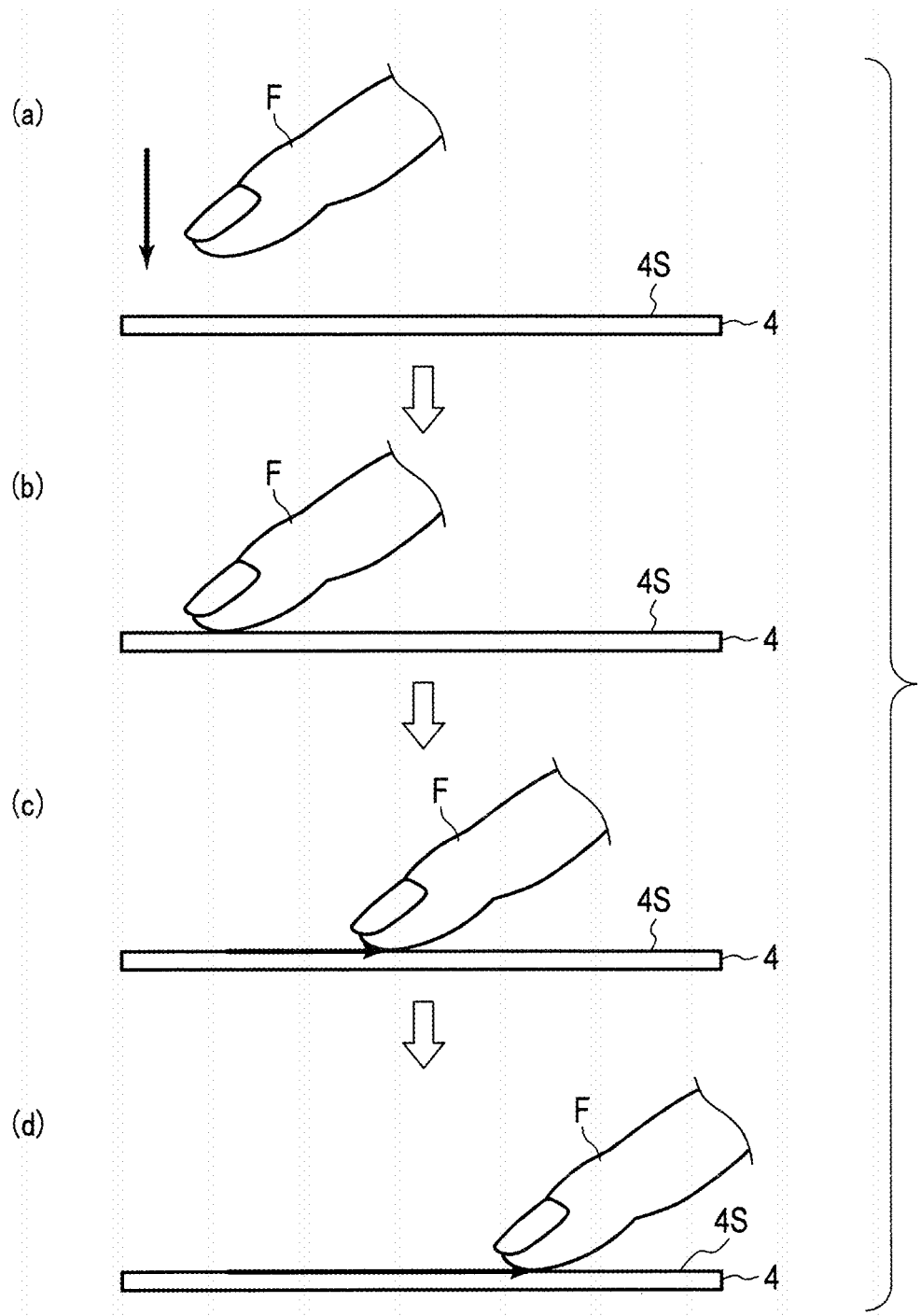
FIG. 8 is a diagram schematically showing an example of a slide operation on the touch panel.
Figure 11:
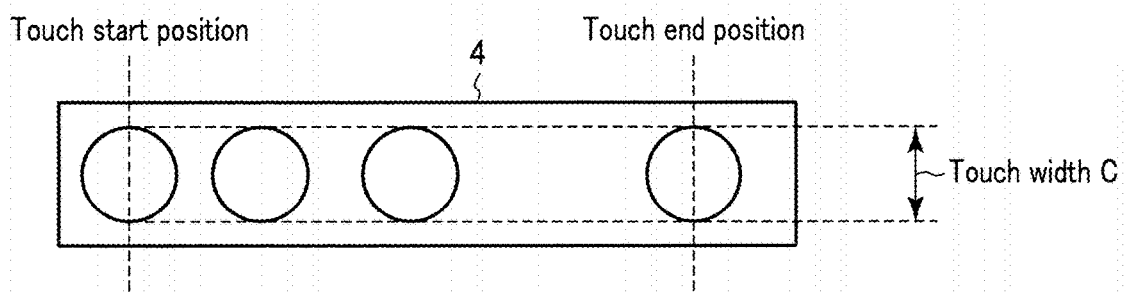
FIG. 11 is a diagram schematically showing an example of the change in touch width in the slide operation.
Figure 12:
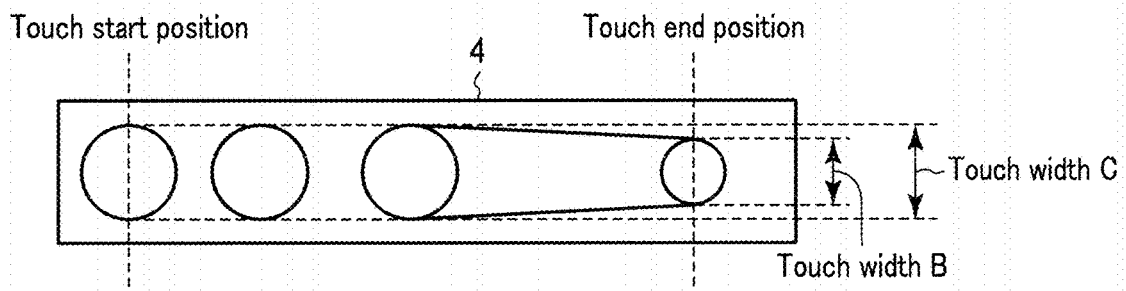
FIG. 12 is a diagram schematically showing an example of the change in touch width in the first line drawing operation.
Figure 13:
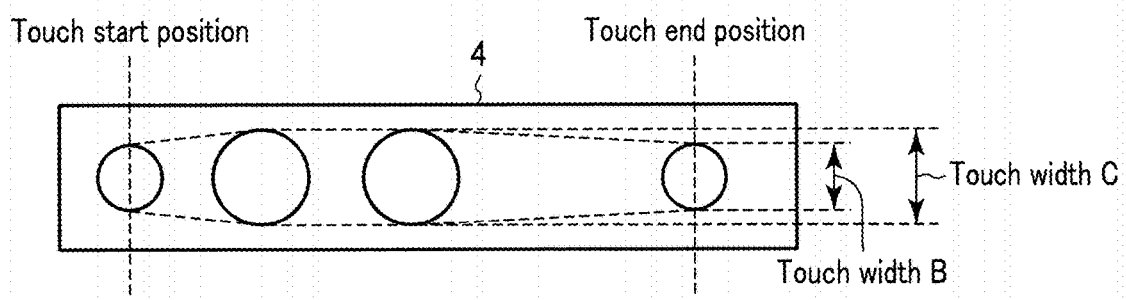
FIG. 13 is a diagram schematically showing an example of the change in touch width in the second line drawing operation.

FIG. 8 is a diagram schematically showing a slide operation on the touch panel 4. FIG. 9 is a diagram schematically showing an example of a line drawing operation on the touch panel 4. FIG. 10 is a diagram schematically showing another example of a line drawing operation on the touch panel 4. FIG. 11, FIG. 12, and FIG. 13 are diagrams schematically showing the changes in touch width attributed to the operations shown in FIG. 8, FIG. 9, and FIG. 10, respectively.

Figure 14:
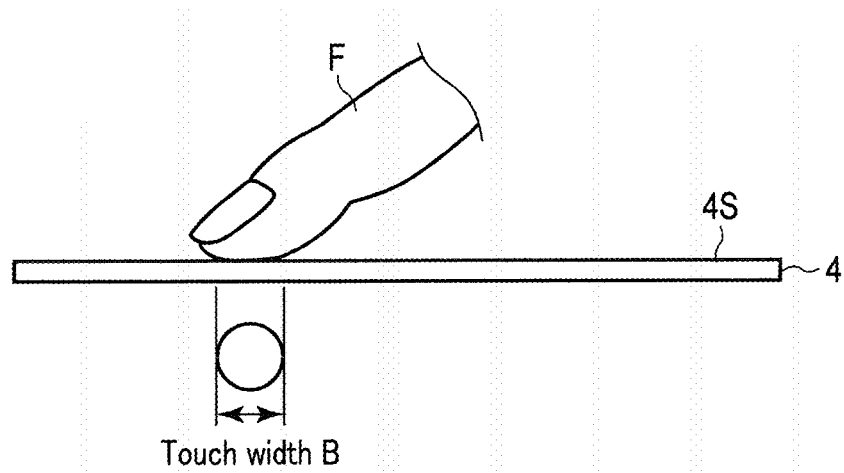
FIG. 14 is a diagram showing an example of a touch width on the touch panel.
Figure 15:
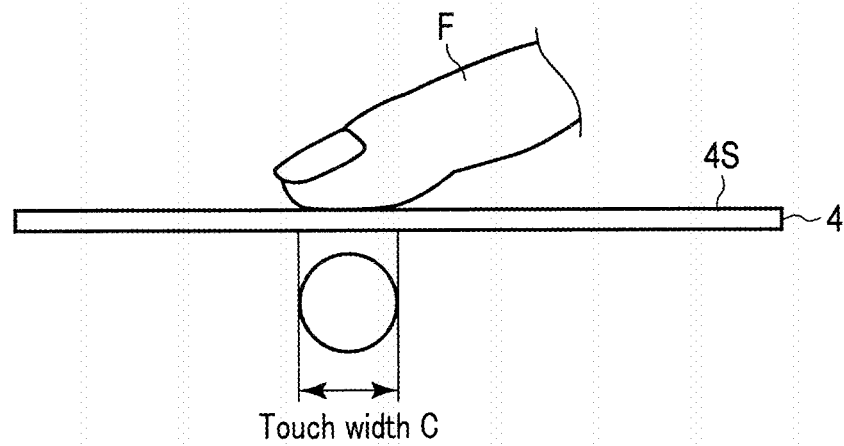
FIG. 15 is a diagram showing another example of a touch width on the touch panel.

When the slide operation is performed on the touch panel 4, the user first certainly presses the detection object F that is the finger to a desired position on the detection plane 4S of the touch panel 4 as shown in FIG. 8 (FIG. 8(a)→FIG. 8(b)). In this state, the user moves the finger to another position (FIG. 8(b)→FIG. 8(c)→FIG. 8(d)). The detection object F moves substantially perpendicularly to the detection plane 4S when the detection object F is brought closer to the detection plane 4S and when the detection object F is brought away from the detection plane 4S. However, this perpendicularity does not need to be strict. In this instance, the user certainly presses the finger at the same position of the touch panel 4 as shown in FIG. 14 and FIG. 15. Thus, the touch width increases from a touch width B to a touch width C at the same position. When the slide operation shown in FIG. 8 is performed, ensuring the movement from a desired position to another position is important, so the user needs to operate in consideration of the touch position. Thus, as shown in FIG. 11, FIG. 14, and FIG. 15, the user certainly presses the finger at the touch start position on the touch panel 4 (the touch width B in FIG. 14→the touch width C in FIG. 15), and the touch width from the touch start position to the touch end position is substantially constant (FIG. 11).

In contrast, when a line drawing operation (hereinafter referred to as a "first line drawing operation") is performed on the touch panel 4, the user first lightly puts the detection object. F that is the finger at a desired position on the detection plane 4S of the touch panel 4 as shown in FIG. 9 (FIG. 9(a)→FIG. 9(b)). In this state, the user instantaneously moves the finger to another position (FIG. 9(b)→FIG. 9(c)→FIG. 9(d)). When the first line drawing operation shown in FIG. 9 is performed, the user has only to allow the touch panel 4 to detect the movement of the finger even if the finger slightly moves away from the touch panel 4. Therefore, the user has only to instantaneously pay attention to the fingertip at the start of the touch, and can reduce unnecessary consideration of, for example, shaking during grasping or touching of the portable device 1. Consequently, as shown in FIG. 12, the first line drawing operation decreases the touch width with time toward the end of the display region in the display unit 3 (the touch width C→the touch width B).

When another line drawing operation (hereinafter referred to as a "second line drawing operation") is performed on the touch panel 4, the user first lightly puts the detection object F that is the finger at a desired position on the detection plane 4S of the touch panel 4 as shown in FIG. 10 (FIG. 10(a)→FIG. 10(b)). In this state, the user instantaneously moves the finger to another position (FIG. 10(b)→FIG. 10(c)→FIG. 10(d)). When the second line drawing operation shown in FIG. 10 is performed, it is only necessary to be able to detect the movement of the finger even if the user starts touching at a position where the finger is located slightly away from the desired position. Therefore, the user has only to instantaneously pay attention to the fingertip at the start of the touch, and can reduce unnecessary consideration of, for example, shaking during grasping or touching of the portable device 1. Consequently, as shown in FIG. 13, the second line drawing operation gradually increases the touch width from one screen end of the display unit 3 to the other screen end, and then gradually decreases the touch width toward the other screen end (the touch width B→the touch width C→the touch width B). More specifically, the second line drawing operation gradually increases the touch width at the touch start position along with the movement on the display region in the display unit 3, and then gradually decreases the touch width toward the end of the display region in the display unit 3.

Thus, the line drawing determination unit 72 determines the change in touch width from the touch start position to the touch end position on the basis of the result of detection by the detection unit 71, or determines whether the touch operation by the user is the slide operation or the line drawing operation on the basis of the touch start position or the touch end position in the display region of the display unit 3. Specifically, the line drawing determination unit 72 determines that the operation is the line drawing operation when determination that the touch width has increased with time during the movement from the touch start position to the touch end position. In contrast, the line drawing determination unit 72 determines that the operation is the slide operation when determination that the touch width has not increased with time during the movement from the touch start position to the touch end position.

Back to FIG. 5B, description in and after step S212 is continued. In step S212, the display control unit 76 describes and displays a straight line connecting the touch start position to the touch end position up to the screen end of the display unit 3 on the basis of the result of detection by the detection unit 71. Specifically, as shown in FIG. 16 and FIG. 17, the display control unit 76 describes and displays a straight line A10 connecting the touch start position to the touch end position up to the screen end of the display unit 3. That is, the display shown in FIG. 17 is performed when an operation shown in FIG. 16 is performed. As a result, the user can intuitively recognize the trace of the touch positions resulting from the line drawing operations. While the display control unit 76 causes the display unit 3 to display the straight line connecting the touch start position to the touch end position in FIG. 17, the display control unit 76 may display, for example, no image corresponding to a closed region R1 formed by a straight line and the ends of the display region of the display unit 3 (e.g., display the image in black).

Figure 18:
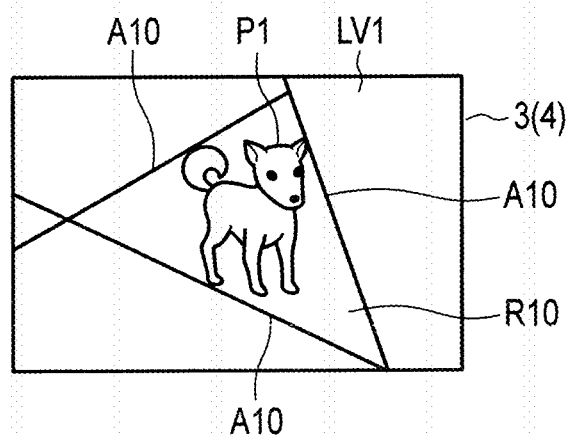
FIG. 18 is a diagram schematically showing an example of a closed region formed by the line drawing operation.

In step S213, the closed region determination unit 73 determines whether a closed region has been formed on the display region of the display unit 3 as a result of the line drawing operations by the user. For example, in the case shown in FIG. 18, the closed region determination unit 73 determines that a closed region R10 has been formed on the display region of the display unit 3 as a result of the line drawing operations by the user. When the closed region has been formed (step S213: yes), the processing proceeds to step S214. In step S214, the imaging control unit 75 causes the imaging unit 2 to perform photography.

In step S215, the image processing unit 74 performs trimming processing to trim the closed region R10 formed as a result of the line drawing operations by the user from a photographic image corresponding to photographic image data generated by the imaging unit 2. In this way, the image processing unit 74 generates trimmed image data. Thus, the user can obtain an image in the desired region alone. After step S215, the processing returns to the main routine shown in FIG. 2.

When it is determined in step S213 that no closed region has been formed (step S213: no), the processing returns to the main routine shown in FIG. 2.

When the line drawing determination unit 72 determines in step S210 that the touch width has not increased with time during the movement from the touch start position to the touch end position (step S210: no), the processing proceeds to step S216. In step S216, the line drawing determination unit 72 determines that the operation on the touch panel 4 is a slide operation. After step S216, the processing returns to the main routine shown in FIG. 2.

When it is determined in step S209 that the touch start position is not at the screen end of the display region in the display unit 3 (step S209: no), the processing proceeds to step S217. In step S217, the line drawing determination unit 72 determines whether the touch end position is at the screen end of the display unit 3 on the basis of the result of detection by the detection unit 71. When the touch end position is at the screen end of the display unit 3 (step S217: yes), the processing proceeds to step S218. In contrast, when the touch end position is not at the screen end of the display unit 3 (step S217: no), the processing proceeds to step S219.

In step S218, the line drawing determination unit 72 determines whether the touch width has decreased with time. When the touch width has decreased with time (step S218: yes), the processing proceeds to step S211. That is, it is determined that the line drawing operation has been performed. In contrast, when the touch width has not decreased with time (step S218: no), the processing proceeds to step S219.

In step S219, the line drawing determination unit 72 determines that the operation on the touch panel 4 is a slide operation. After step S219, the processing returns to the main routine shown in FIG. 2.

In the present embodiment, the detection unit 71 detects the behavior of a touch at the end position where the detection object has come away from the touch panel 4, and the line drawing determination unit 72 determines whether the line drawing operation has been performed on the basis of the direction, trace, and behavior of the touch. When the touch width detected by the detection unit 71 gradually decreases from the start position to the end position, the line drawing determination unit 72 determines that the line drawing operation has been performed. Therefore, according to the present embodiment, the line drawing operation is certainly distinguished from a conventional flick operation and the slide operation. Thus, the line drawing operation which is a new touch operation can be provided. The line drawing operation is a rapid touch operation different from the slide operation which is slowly performed.

In the present embodiment, when a closed region is formed by the line drawing operations, trimmed image data in which a region corresponding to this closed region is cut out is generated. Thus, according to the present embodiment, a new operation method can be provided.

In the present embodiment, when the closed region determination unit 73 determines that a closed region has been formed, the imaging control unit 75 causes the imaging unit 2 to perform photography. Thus, according to the present embodiment, a release operation can be provided.

In the example shown in the present embodiment, the image processing unit 74 generates the trimmed image data for the image corresponding to the image data obtained by the imaging unit 2. Moreover, for example, when the closed region determination unit 73 determines that a closed region has been formed in the display region of the display unit 3, the image processing unit 74 may generate trimmed image data regarding a live-view image corresponding to this closed region.

Second Embodiment

The second embodiment is described next. The second embodiment comprises a configuration similar to the configuration of the portable device 1 according to the first embodiment described above, and is different in the touch determination processing. Thus, the touch determination processing which is executed by the portable device 1 according to the second embodiment is described below. The same components as those of the portable device 1 according to the first embodiment described above are provided with the same reference marks and are not described.

(Touch Determination Processing)

Figure 19A:
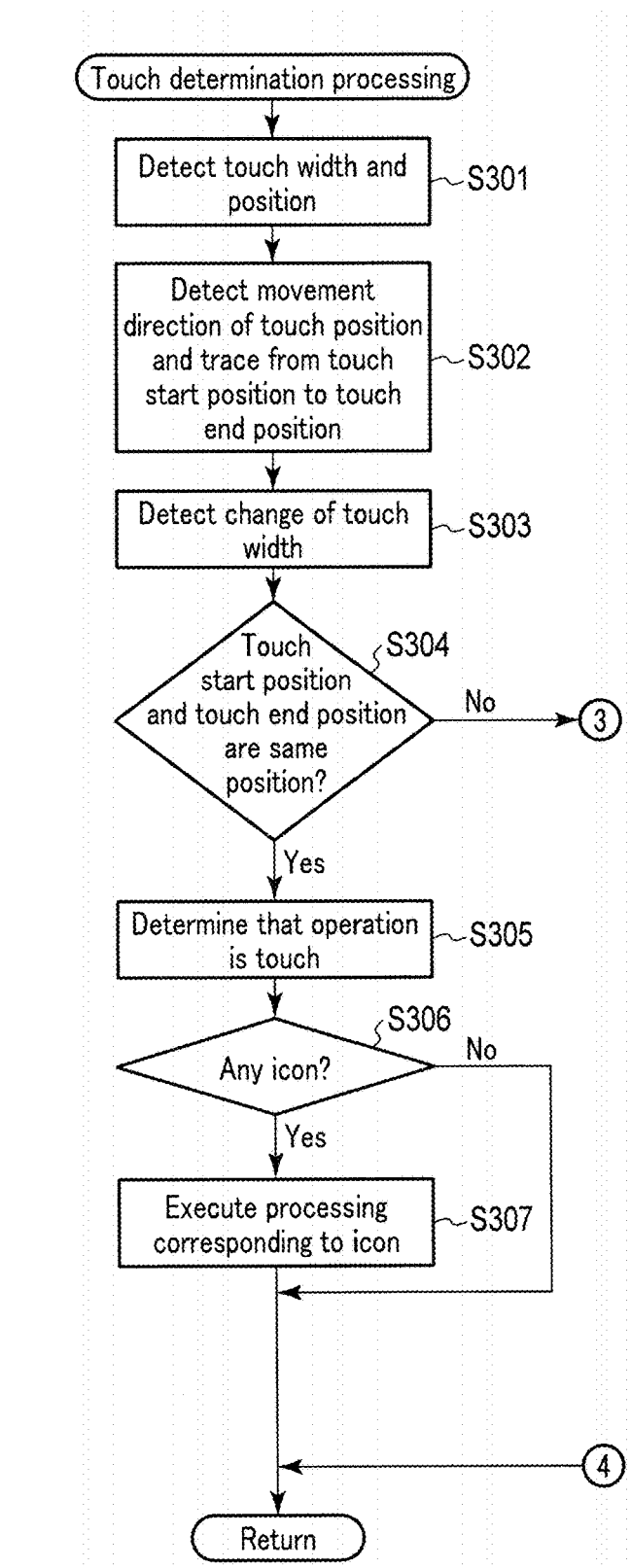
FIG. 19A is a flowchart showing an overview of an example of touch determination processing executed by a portable device according to a second embodiment.

FIG. 19A and FIG. 19B are flowcharts showing an overview of the touch determination processing executed by the portable device 1 according to the second embodiment.

Step S301 to step S308 correspond to step S201 to step S208 described with reference to FIG. 5A and FIG. 5B, respectively.

In step S309, the detection unit 71 calculates a touch width which is predicted at a screen end of the display region in the display unit 3.

In step S310, the line drawing determination unit 72 then determines whether the predicted touch width at the screen end is less than or equal to a predetermined value. When the predicted touch width is less than or equal to the predetermined value (step S310: yes), the processing proceeds to step S311. In step S311, the line drawing determination unit 72 determines that the operation on the touch panel 4 is the line drawing operation.

A calculation method whereby the detection unit 71 calculates a touch width which is predicted at the screen end of the display region in the display unit 3 is described here. FIG. 20 is a schematic diagram illustrating the calculation method of the touch width predicted at the screen end of the display region in the display unit 3 calculated by the detection unit 71. In FIG. 20, the horizontal axis indicates the position (coordinates) in the display region of the display unit 3, and the vertical axis indicates the touch width. A solid line L1a indicates the change in touch width in the slide operation, a dashed-dotted line L1b indicates the change in touch width in the first line drawing operation, and a broken line L1c indicates the change in touch width in the second line drawing operation. A touch end time in the slide operation is described as a touch end time A, and a touch end time in the first line drawing operation or the second line drawing operation is described as a touch end time B. In FIG. 20, the length of the display region of the display unit 3 is L.

As shown in FIG. 20, when performing the slide operation, the user moves the finger from the touched position to a desired position, and therefore acts deliberately. In contrast, when performing the line drawing operation, the user operates as if cutting with scissors from one screen end to the other screen end in the display region of the display unit 3, and is therefore not aware of the exact position. Thus, as indicated by the dashed-dotted line L1b and the broken line L1c, it is considered that the finger gradually moves away from the touch panel 4 (the touch width gradually decreases) at the touch end.

Accordingly, the detection unit 71 estimates the intention of the user's operation on the basis of the touch width at the touch start and the touch width at the touch end. That is, the detection unit 71 estimates a touch width E at the end of the display region on the basis of a position Pc where the touch width is a width C and a position Pd of the touch end where the touch width is a width B. Specifically, the detection unit 71 calculates the touch width E by Equation (1) below:

$$E=C-((C-B)\times(L-Pc)/(Pd-Pc)) \qquad (1)$$

wherein C and B are the touch widths, Pc is the position where the touch width is C, Pd is the position where the touch width is B, and L is the length of the display unit 3 in the longitudinal direction.

Thus, the line drawing determination unit 72 determines whether the touch width predicted at the screen end is less than or equal to the predetermined value that has been set in advance, and determines that the operation is the line drawing operation when the predicted touch width is less than or equal to the predetermined value. In contrast, the line drawing determination unit 72 determines that the operation is the slide operation when the predicted touch width is not less than or equal to the predetermined value.

Back to FIG. 19B, description in and after step S312 is continued. Step S312 to step S316 correspond to step S212 to step S216 described with reference to FIG. 5B, respectively.

In the present embodiment, when the touch width which is predicted at the screen end of the display unit 3 detected by the detection unit 71 is less than or equal to the predetermined value, it is determined that the line drawing operation has been performed. Therefore, in the present embodiment, the line drawing operation can be certainly distinguished from the conventional flick operation or the slide operation. Thus, the line drawing operation which is a rapid touch operation can be provided.

Third Embodiment

Next, the third embodiment of the present invention is described. The third embodiment provides a configuration similar to the configuration of the portable device 1 according to the first embodiment described above, and is different in the touch determination processing. Thus, the touch determination processing which is executed by the portable device 1 according to the third embodiment is described below. The same components as those of the portable device 1 according to the first embodiment described above are provided with the same reference marks and are not described.

(Touch Determination Processing)

Figure 21B:
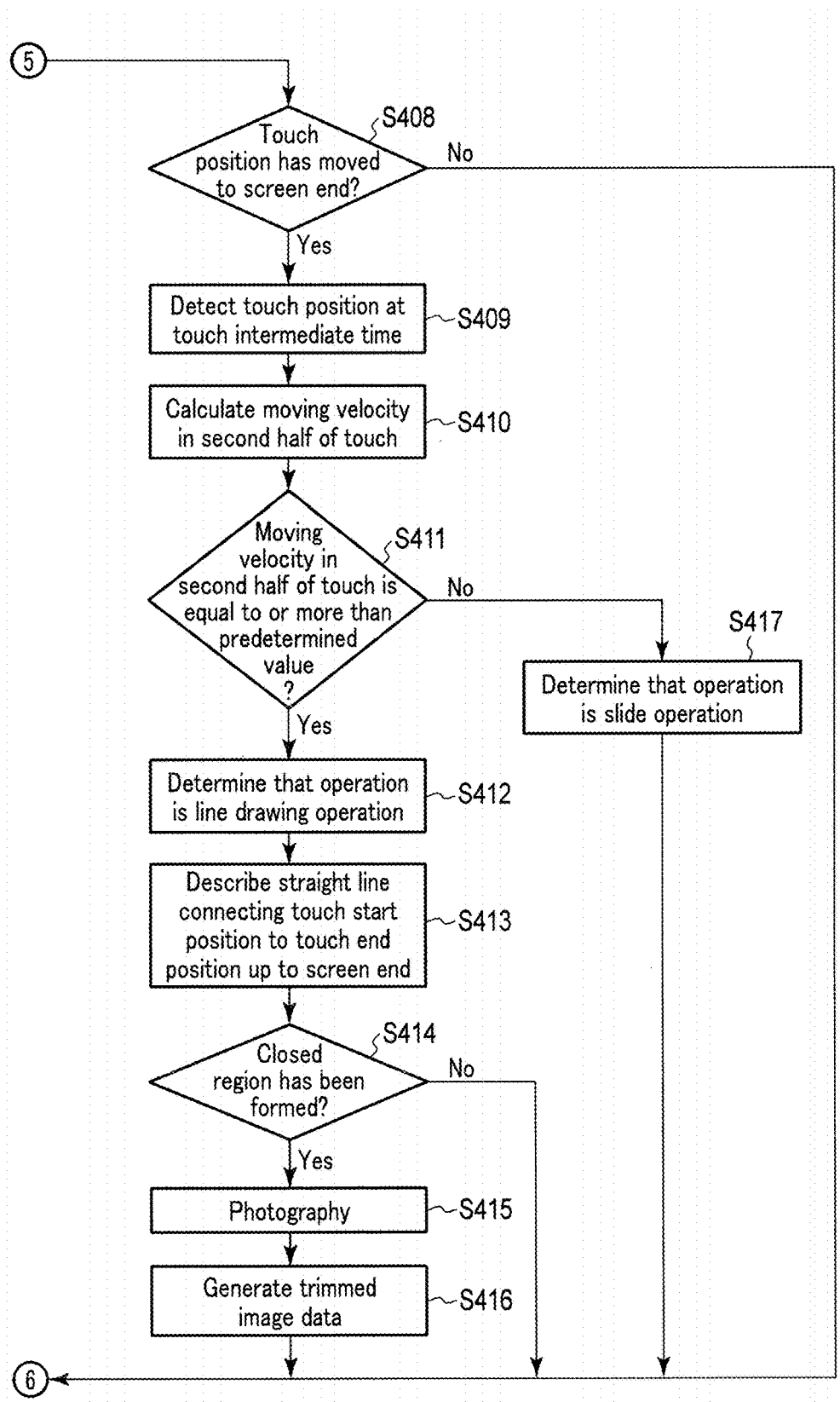
FIG. 21B is a flowchart showing an overview of an example of the touch determination processing executed by the portable device according to the third embodiment.

FIG. 21A and FIG. 21B are flowcharts showing an overview of the touch determination processing executed by the portable device 1 according to the third embodiment.

In step S401, the detection unit 71 detects a touch position on the touch panel 4 at the touch start and a touch start time, on the basis of a position signal input from the touch panel 4. In step S402, the detection unit 71 detects a touch end position on the touch panel 4 at the touch end and a touch end time.

In step S403, the detection unit 71 calculates an intermediate time between the touch start time and the touch end time on the basis of the touch start time and the touch end time detected in step S401 and step S402.

Step S404 to step S408 correspond to step S204 to step S208 described with reference to FIG. 5A and FIG. 5B, respectively.

In step S409, the detection unit 71 detects a touch position at the touch intermediate time calculated in step S403.

In step S410, the line drawing determination unit 72 then calculates a moving velocity in the second half of the touch on the basis of the touch position calculated by the detection unit 71 in step S409, the intermediate time between the touch start time and the touch end time, the touch position at the touch end, and the time at the touch end. In step S411, the line drawing determination unit 72 determines whether the moving velocity in the second half of the touch is equal to or more than a predetermined value. When the moving velocity is equal to or more than the predetermined value (step S411: yes), the processing proceeds to step S412. In contrast, when the moving velocity is not equal to or more than the predetermined value (step S411: no), the processing proceeds to step S417.

Figure 22:
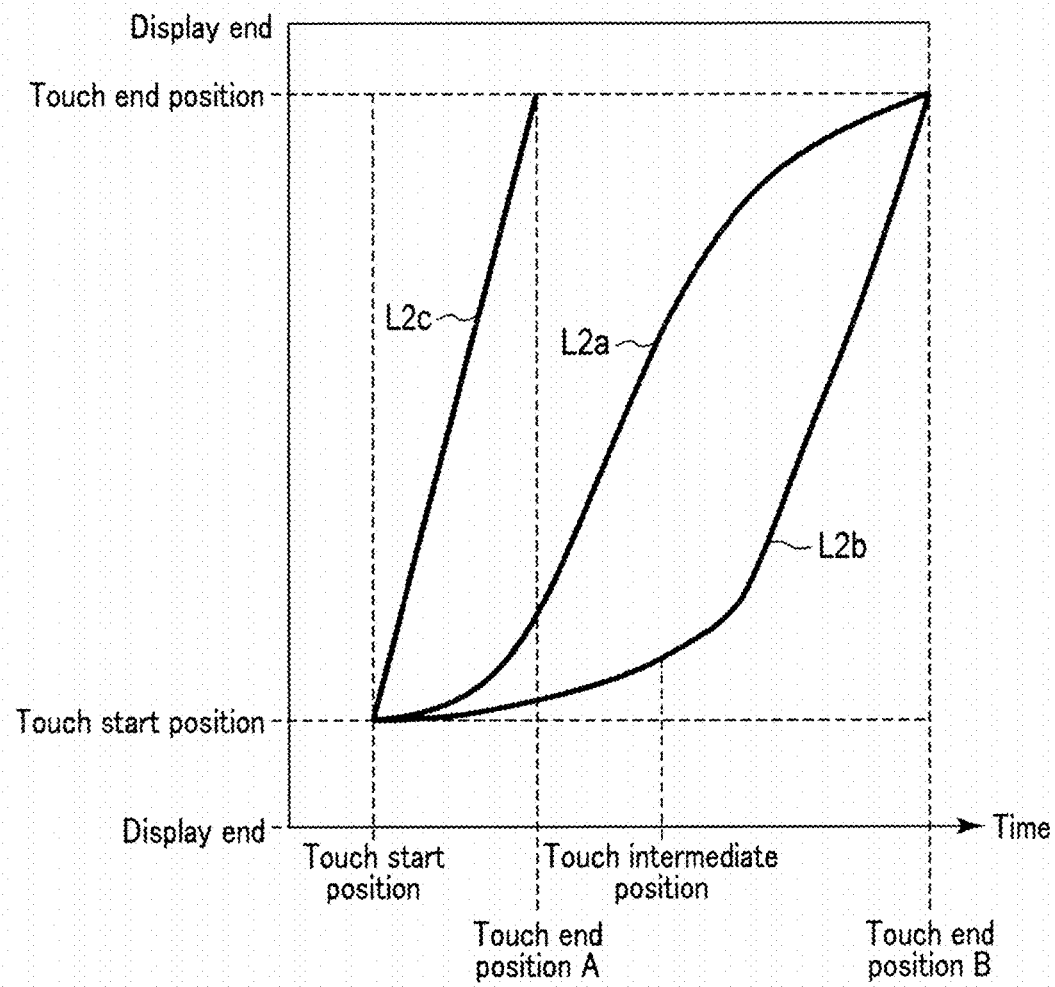
FIG. 22 is a schematic diagram illustrating an overview of a determination method which is performed by the line drawing determination unit.

A determination method which is performed by the line drawing determination unit 72 is described here. FIG. 22 is a schematic diagram illustrating an overview of the determination method which is performed by the line drawing determination unit 72. In FIG. 22, the horizontal axis indicates time, and the vertical axis indicates position from one end to the other end in the display region of the display unit 3. A curve L2a indicates the change of the moving velocity in the slide operation, a curve L2b indicates the change of the moving velocity of the touch in the first line drawing operation, and a curve L2c indicates the change of the moving velocity of the touch in the second line drawing operation. In FIG. 22, the changes of the touch position in the longitudinal direction in the display region of the display unit 3 are illustrated.

As indicated by the curve L2a in FIG. 22, when performing the slide operation, the user moves the finger from the touch start position to the touch end position substantially at a constant velocity. In contrast, as indicated by the curve L2b in FIG. 22, when performing the first line drawing operation, the user determines the position of the first line drawing operation and the touch direction to some degree and then moves the finger at high velocity. Alternatively, as indicated by the curve L2c in FIG. 22, when performing the second line drawing operation, the user instantaneously determines the start position of the line drawing operation and the touch direction and then moves the finger at high velocity. Thus, on the basis of the calculation result in step S410, the line drawing determination unit 72 determines that the operation is the line drawing operation when the moving velocity in the second half of the touch is equal to or more than the predetermined value. In contrast, the line drawing determination unit 72 determines that the operation is the slide operation when the moving velocity in the second half of the touch is not equal to or more than the predetermined value.

Step S412 to step S417 correspond to step S211 to step S216 described with reference to FIG. 5A and FIG. 5B, respectively.

According to the present embodiment, the line drawing determination unit 72 determines that the line drawing operation has been performed when the moving velocity of the touch on the touch panel 4 detected by the detection unit 71 is equal to or more than the predetermined value. Therefore, the line drawing operation can be certainly distinguished from the conventional flick operation or the slide operation. Thus, the line drawing operation which is a new touch operation can be provided.

Fourth Embodiment

The fourth embodiment is described next. The fourth embodiment is different in the configuration of the touch panel 4 from that in the portable device 1 according to the first embodiment and in the touch determination processing. The configuration of a portable device and the touch determination processing according to the fourth embodiment are described next. The same components as those of the portable device 1 according to the first embodiment described above are provided with the same reference marks and are not described.

(Configuration of Portable Device)

FIG. 23 is a block diagram showing a functional configuration of the portable device according to the fourth embodiment. A portable device 1a shown in FIG. 23 comprises a touch panel 4a instead of the touch panel 4 of the portable device 1 according to the first embodiment described above. This touch panel 4a is a capacitance type touch panel.

Figure 24:
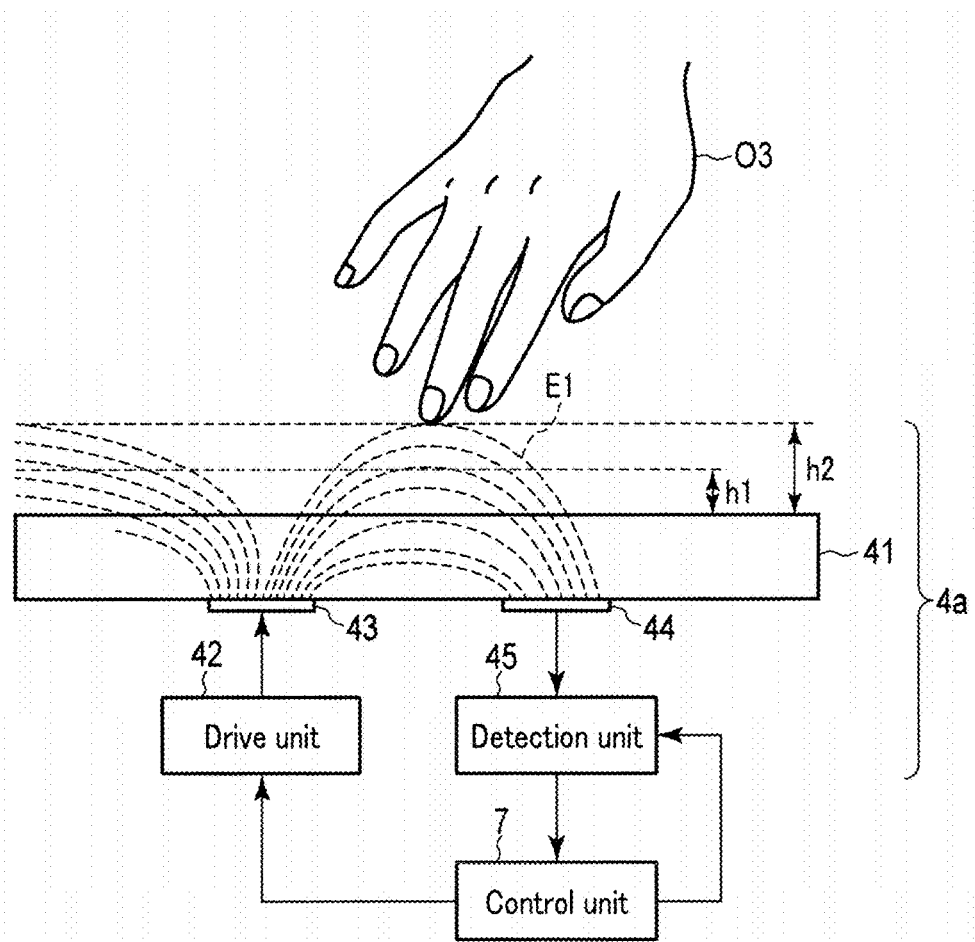
FIG. 24 is a schematic diagram showing an overview of a configuration example of a touch panel according to the fourth embodiment.

FIG. 24 is a schematic diagram showing a general configuration of the touch panel 4a according to the present embodiment. The touch panel 4a has a front panel 41, a drive unit 42, drive electrodes 43, receiving electrodes 44, and a detection unit 45.

The front panel 41 has a predetermined thickness, and is made of transparent glass or polyethylene terephthalate (PET) that is in a rectangular shape in a planar view. That is, the front panel 41 includes a dielectric.

The drive unit 42 outputs a drive pulse (e.g., an applied voltage of 5 V) to the drive electrodes 43, and forms a capacitance between the drive electrodes 43 and the receiving electrodes 44.

The drive electrodes 43 and the receiving electrodes 44 are transparent electrodes made of a material such as indium tin oxide (ITO). The drive electrodes 43 and the receiving electrodes 44 are alternately provided on the lower surface of the front panel 41 in matrix form with a pitch of, for example, 5 mm in the longitudinal direction and the lateral direction, respectively. The detection unit 45 includes a capacitance sensor.

Figure 25:
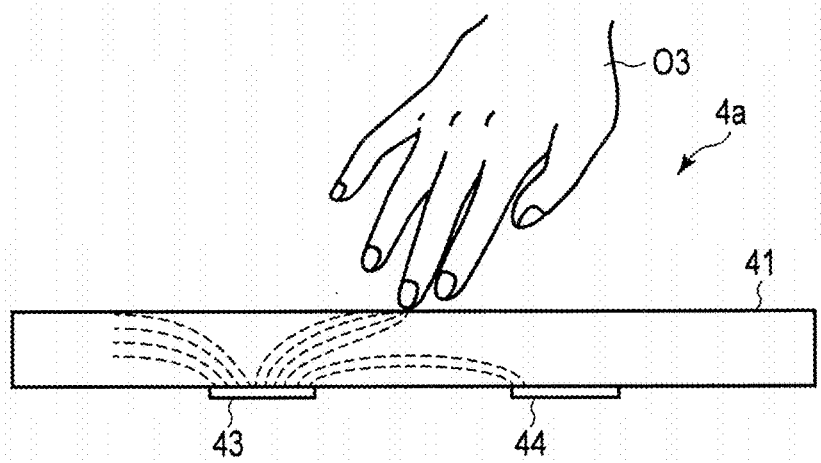
FIG. 25 is a schematic diagram showing an overview of the configuration example of the touch panel according to the fourth embodiment.

In this touch panel 4a, an electric field facing toward the receiving electrodes 44 from the drive electrodes 43 is generated in the front panel 41 if, for example, a given intensity of an electric signal is input to the drive electrodes 43 from the drive unit 42. In this instance, a charge moves along this electric field, so that the electric signal is output to the detection unit 45 from the receiving electrodes 44. Here, for example, as shown in FIG. 25, an electric field is also generated from the drive electrodes 43 to the finger in the front panel 41 if the finger of a hand O3 of the user contacts the front panel 41. In contrast, if an electric field is generated from the drive electrodes 43 toward the finger, the electric field facing toward the receiving electrodes 44 from the drive electrodes 43 weakens, and the number of charges that move along this electric field decreases. As a result, the intensity of the electric signal output from the receiving electrodes 44 decreases. Thus, the electric field between the drive electrodes 43 and the receiving electrodes 44 changes depending on whether the finger contacts the touch panel 4, and different intensities of electric signals are detected by the detection unit 45. Therefore, whether the finger is in contact with the touch panel 4 can be determined on the basis of the intensity of the electric signal detected by the detection unit 45.

Furthermore, the touch panel 4a according to the present embodiment can detect the change of the electric field between the drive electrodes 43 and the receiving electrodes 44 even when the finger and the front panel 41 are away from each other. Here, when the distance between the finger and the drive electrodes 43 is greater, the number of charges running from the drive electrodes 43 to the finger is smaller, and the number of charges running from the drive electrodes 43 to the receiving electrodes 44 is larger. As a result, the intensity of the electric signal output from the receiving electrodes 44 increases. Therefore, how high the finger is located from the touch panel 4 can be determined on the basis of the intensity of the electric signal output from the receiving electrodes 44. That is, as shown in FIG. 24, a slight change in amount of the capacitance formed between the drive electrodes 43 and the receiving electrodes 44 can be detected when the hand O3 of the user comes closer to an electric field E1. This detection unit 45 is disclosed in, for example, the specification of U.S. Pat. No. 7,148,704.

For example, when the hand O3 of the user has contacted (touched) the front panel 41, a value of about 1 pF is detected as a change amount. By the use of this technique, the detection unit 45 can detect a slight change in the capacitance formed between the drive electrodes 43 and the receiving electrodes 44 even before the hand O3 of the user contacts the front panel 41. Specifically, the detection unit 45 can distinguish between the location of the hand O3 at a distance h1 (e.g., 0.5 cm) and the location of the hand O3 at a distance h2 (e.g., 1 cm) as shown in FIG. 24. That is, even when the finger moves a slight distance without touching the touch panel 4a, the detection unit 45 can detect a change in the capacitance formed between the drive electrodes 43 and the receiving electrodes 44.

Although an operation with the finger is detected by the touch panel 4 in the present embodiment, a pen, for example, may be used instead of a finger. These objects, including a finger and pen to perform input to the touch panel 4a, are generically referred to as detection objects. In the following explanation, the position of the detection object is referred to as a detection object point. Thus, according to the touch panel 4a in the present embodiment, the position of a point where the detection object point is projected on the detection plane (hereinafter referred to as an in-plane position) can be specified. According to the touch panel 4a in the present embodiment, the height of the detection object point from the detection plane can also be specified.

The touch panel 4a having the configuration described above is provided on the display screen of the display unit 3. The touch panel 4a detects a contact position of an external object or a position of existence of an object in the vicinity of the surface. In this way, the touch panel 4a receives a user's operation. Specifically, on the basis of information displayed by the display unit 3, the touch panel 4a detects a change in the capacitance caused by the change of an electric field formed around the display screen before the user touches the screen of the touch panel 4a.

(Touch Determination Processing)

Figure 26A:
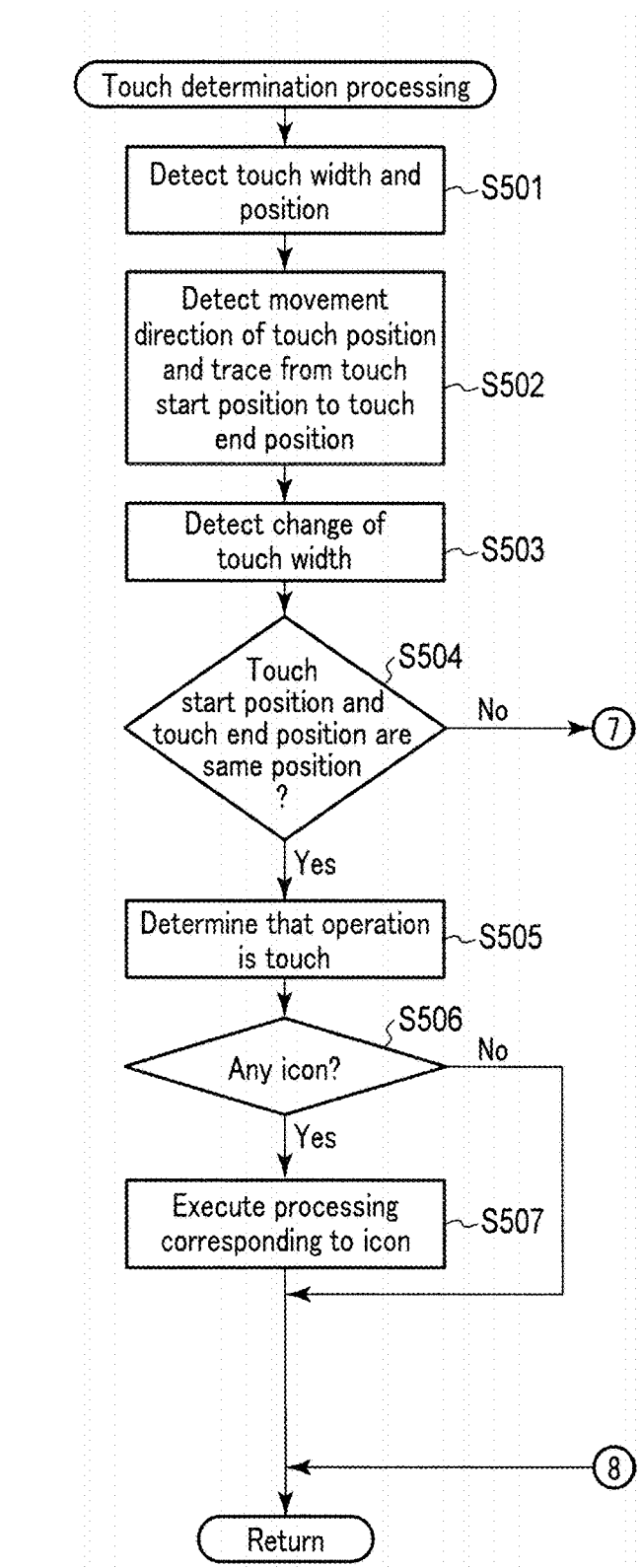
FIG. 26A is a flowchart showing an overview of an example of touch determination processing executed by the portable device according to the fourth embodiment.
Figure 26B:
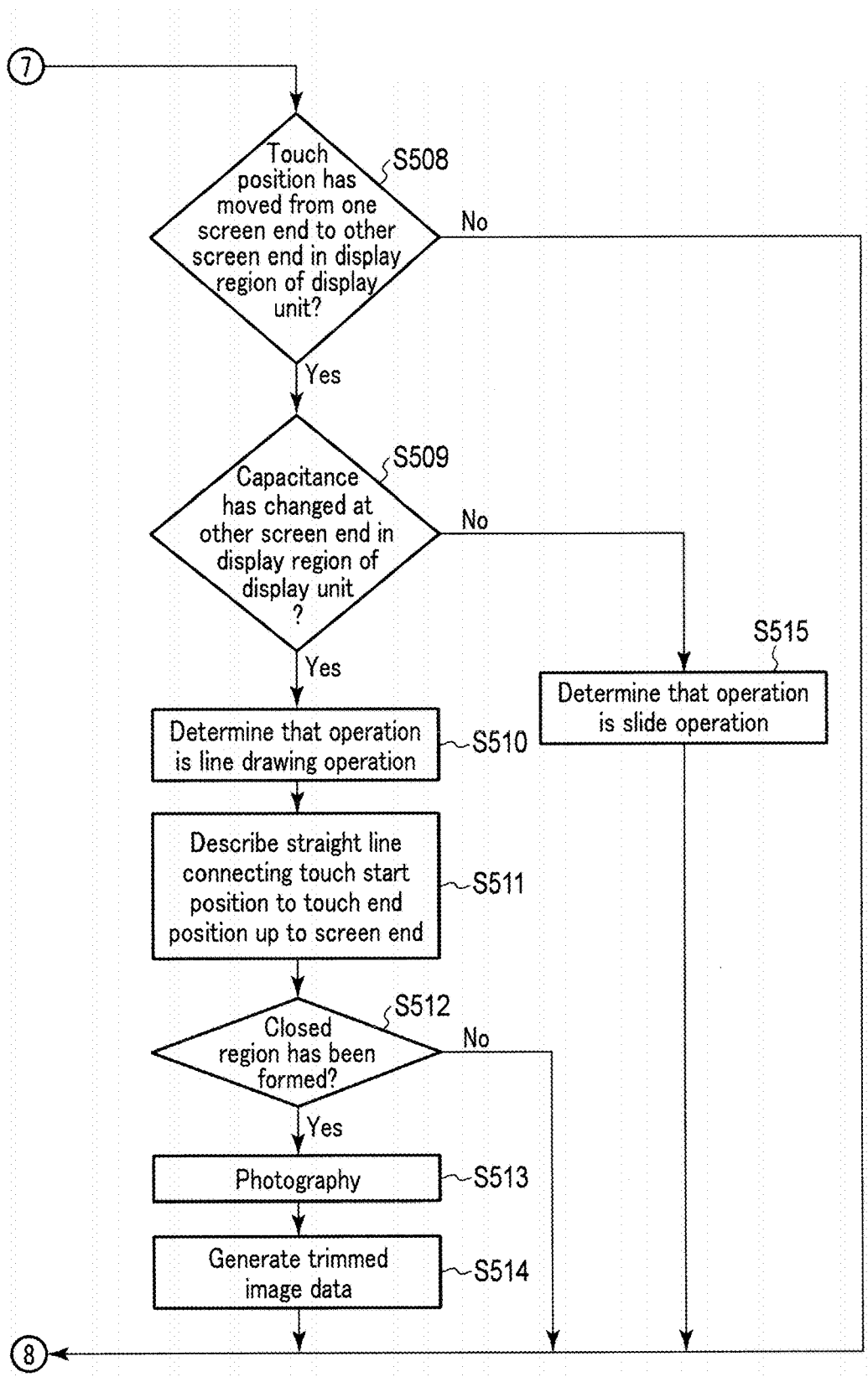
FIG. 26B is a flowchart showing an overview of an example of the touch determination processing executed by the portable device according to the fourth embodiment.

The touch determination processing executed by the portable device 1a is described next. FIG. 26A and FIG. 26B are flowcharts showing an overview of the touch determination processing executed by the portable device 1a.

In FIG. 26A and FIG. 26B, step S501 to step S507 correspond to step S201 to step S207 described with reference to FIG. 5A and FIG. 5B, respectively.

In step S508, the line drawing determination unit 72 determines whether the touch position has moved from one screen end to the other screen end in the display region of the display unit 3 on the basis of a position signal acquired from the touch panel 4a. When the touch position has moved from one screen end to the other screen end (step S508: yes), the processing proceeds to step S509. In contrast, when the touch position has not moved from one screen end to the other screen end (step S508: no), the processing returns to the main routine shown in FIG. 2.

In step S509, the line drawing determination unit 72 determines whether the capacitance has changed at the other screen end in the display region of the display unit 3 on the basis of the position signal input from the touch panel 4a. When the capacitance has changed (step S509: yes), the processing proceeds to step S510. In step S510, the line drawing determination unit 72 determines that the operation is the line drawing operation. In contrast, when the capacitance has not changed (step S509: no), the processing proceeds to step S515.

Figure 27:
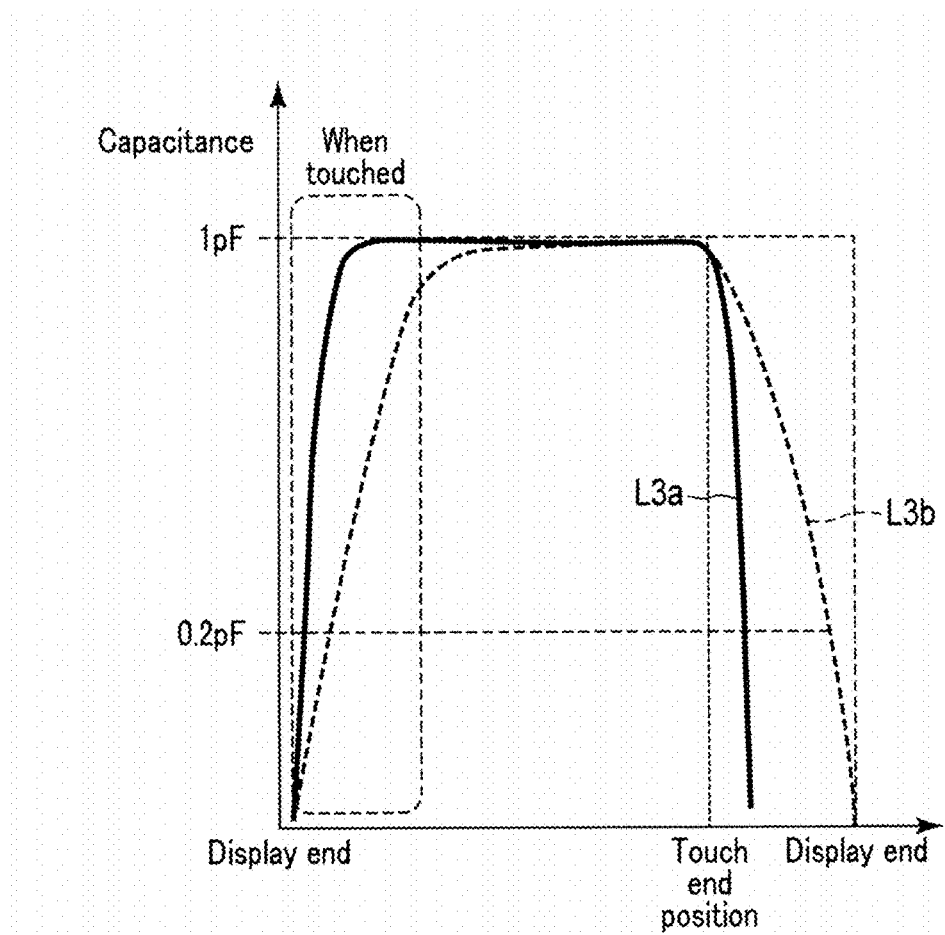
FIG. 27 is a schematic diagram illustrating an overview of a determination method which is performed by the line drawing determination unit.

A determination method which is performed by the line drawing determination unit 72 is described here. FIG. 27 is a schematic diagram illustrating an overview of the determination method which is performed by the line drawing determination unit 72. In FIG. 27, the horizontal axis indicates the positions from one screen end to the other screen end in the display region of the display unit 3, and the vertical axis indicates the capacitance that is detected. A solid line L3a indicates the change of the capacitance in the slide operation, and a broken line L3b indicates the change of the capacitance in the first line drawing operation or the second line drawing operation. In FIG. 27, the movement of the touch position in the longitudinal direction in the display region of the display unit 3 is described by way of example. It should be understood that the line drawing determination unit 72 also makes a similar determination when the touch position moves diagonally in the display region of the display unit 3.

As indicated by the solid line L3a in FIG. 27, when performing the slide operation, the user moves the finger from the touch start position to the touch end position, and brings the finger away from the touch panel 4a from the touch end position. Therefore, the capacitance does not change at the screen end in the display region of the display unit 3. In contrast, as indicated by the broken line L3b, when performing the first line drawing operation or the second line drawing operation, the user moves the finger from the touch start position to a desired position, and moves the finger away from the touch panel 4a from the touch end position. In this instance, the finger moves to the screen end in the display region of the display unit 3 in the air, so that the capacitance changes at the screen end in the display region of the display unit 3. Specifically, the touch panel 4a detects a capacitance of 0.2 pF at the screen end in the display region of the display unit 3.

The line drawing determination unit 72 determines whether the capacitance has changed at the other screen end in the display region of the display unit 3 on the basis of the position signal input from the touch panel 4a. When the capacitance has changed, the line drawing determination unit 72 determines that the detected operation is the first line drawing operation or the second line drawing operation. In contrast, when the capacitance has not changed, the line drawing determination unit 72 determines that the operation is the slide operation.

Step S510 to step S515 correspond to step S211 to step S216 described with reference to FIG. 5A and FIG. 5B, respectively.

According to the present embodiment, the line drawing determination unit 72 determines that the line drawing operation has been performed when the detection unit 71 detects that the capacitance has gradually decreased from one end to the other end in the display region of the display unit 3 along with the movement of the touch. As a result, the line drawing operation can be certainly distinguished from the conventional flick operation or the slide operation. Thus, the line drawing operation which is a new touch operation can be provided.

A portable terminal which is held with one hand in use requires an operation that does not affect light and rapid holding and stability. The present invention meets such requirements. Specifically, the present invention permits an input to be performed by an instantaneous light operation of the fingertip, and therefore ensures that an operation intended by the user can be acquired.

Fifth Embodiment

The fifth embodiment is described next. The configuration of a portable device 1c comprising an operation device for a portable terminal according to the present embodiment is described with reference to FIG. 28. The same components as those of the portable device 1 according to the first embodiment described above are provided with the same reference marks and are not described.

(Configuration of Portable Device)

FIG. 28 is a block diagram showing an overview of the portable device 1c according to the present embodiment. As shown in FIG. 28, the portable device 1c comprises an imaging unit 2, a display unit 3, a touch panel 4a, an operation unit 5, a recording unit 6, a control unit 7, and a clock 8. The imaging unit 2, the display unit 3, the operation unit 5, the recording unit 6, and the clock 8 are similar to the imaging unit 2, the display unit 3, the operation unit 5, the recording unit 6, and the clock 8 according to the first embodiment, respectively. The touch panel 4a according to the present embodiment is similar to the touch panel 4a according to the fourth embodiment.

As shown in FIG. 28, the control unit 7 according to the present embodiment has an image processing unit 74, an imaging control unit 75, a display control unit 76, and an operation determination unit 77. The image processing unit 74, the imaging control unit 75, and the display control unit 76 are similar to those in the first embodiment, respectively.

The operation determination unit 77 has a position detection unit 771, a direction determination unit 772, a height determination unit 773, an inclination determination unit 774, a velocity determination unit 775, and a number determination unit 776.

The position detection unit 771 detects the height of the detection object point from the detection plane of the touch panel 4. The position detection unit 771 also detects the in-plane position which is the position where the detection object point is projected to on the detection plane. The position detection unit 771 can determine the touch operation, the slide operation, a first operation, and a second operation from the height and the in-plane position as will be described later.

The direction determination unit 772 determines the direction in which the detection object point moves on the basis of information regarding the changes, with time, of the height of the detection object point from the touch panel 4 and the in-plane position. The direction determination unit 772 acquires the direction of the slide operation, the direction of the first operation, and the direction of the second operation.

The height determination unit 773 determines the height of the detection object point from the touch panel 4. The height of the detection object point takes a lower value, for example, when the value of capacitance detected from the touch panel 4 is higher. The height determination unit 773 acquires the height of the detection object point in the touch operation, the height of the detection object point in the slide operation, the height of the detection object point in the first operation, and the height of the detection object point in the second operation.

The inclination determination unit 774 determines an inclination made by a segment drawn by a set of the positions of the detection object points represented by the height and the in-plane position along with the change with time, and the detection plane. The inclination determination unit 774 acquires the inclination of the first operation and the inclination of the second operation.

The velocity determination unit 775 determines the velocity of the detection object point, that is, the finger during operation on the basis of the changes of the height of the detection object point and the in-plane position with time. The velocity determination unit 775 acquires the velocity of the touch operation, the velocity of the slide operation, the velocity of the first operation, and the velocity of the second operation.

The number determination unit 776 determines the number of times that the movement of the detection object point, that is, the finger is repeated along with the change with time. The number determination unit 776 acquires the number of times of the second operation. The control unit 7 performs image processing in accordance with the position, direction, height, inclination, velocity, and the number of times.

Figure 29:
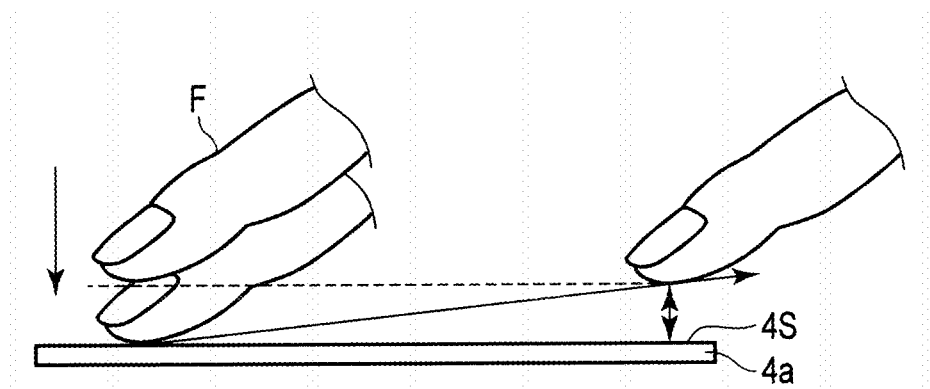
FIG. 29 is a diagram schematically showing an example of a first operation on the touch panel.

In the present embodiment, it is possible to detect the first operation and the second operation in addition to the touch operation and the slide operation. FIG. 29 is a diagram illustrating the first operation which is an example of an operation by the user. As shown in FIG. 29, the first operation is an operation in which the user perpendicularly presses the detection object F to the detection plane 4S, and then gradually brings the detection object away from the detection plane 4S while moving the detection object in an oblique direction from the position where the detection object is pressed to the detection plane 4S.

Figure 30:
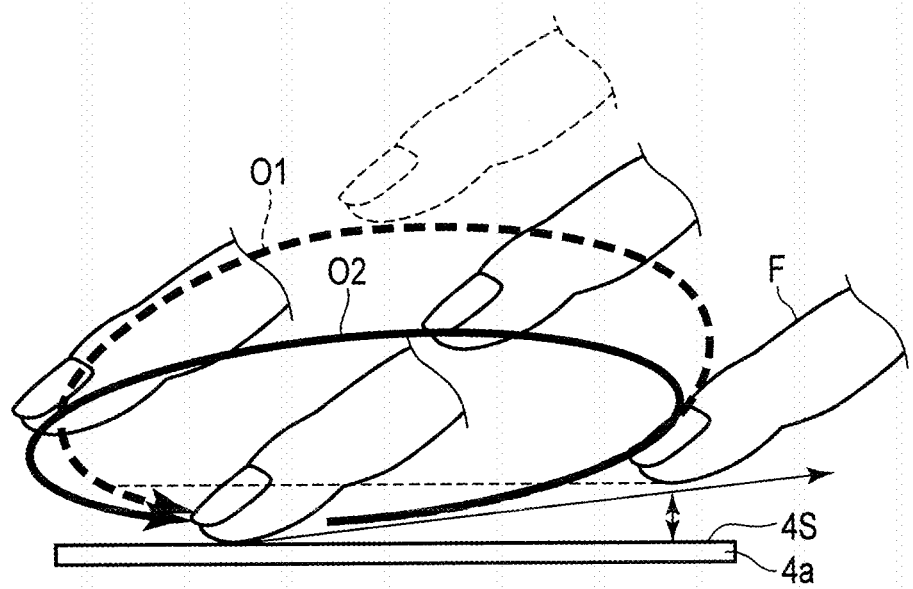
FIG. 30 is a diagram schematically showing an example of a second operation on the touch panel.

FIG. 30 is a diagram illustrating the second operation which is an example of an operation by the user. As shown in FIG. 30, the second operation is an operation in which the user repeats the first operation at the same position on the detection plane 4S.

The second operation may be further classified as a different operation in accordance with the height difference of the traces of the detection object. FIG. 30 shows the second operation which moves the detection object in a large way in the vicinity of the touch panel 4a as in a movement O1 of the detection object, and the second operation which moves the detection object in a small way in the vicinity of the touch panel 4a as in a movement O2 of the detection object.

Figure 32:
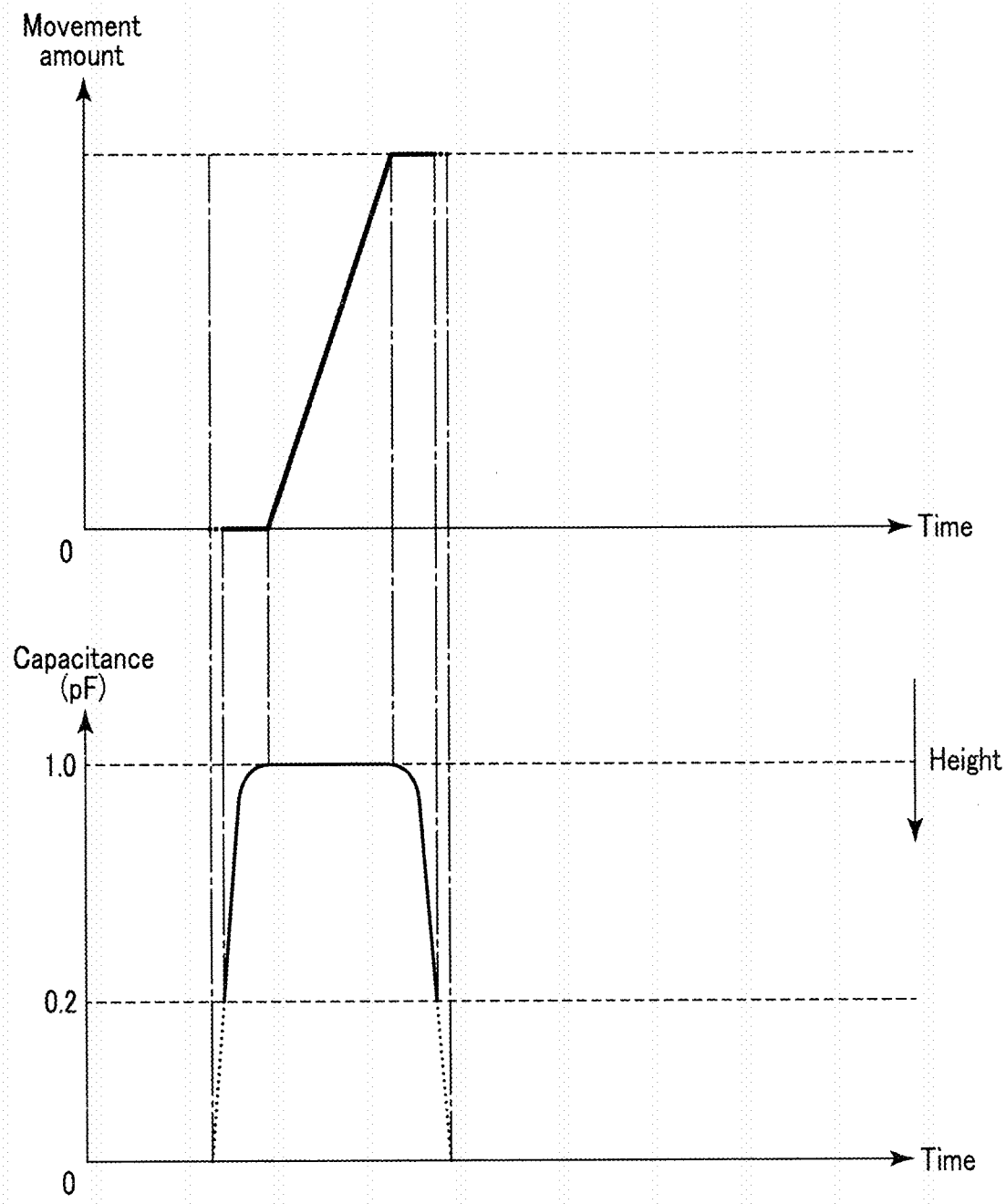
FIG. 32 is a schematic diagram showing an example of the relation between the movement amount of an in-plane position and the value of capacitance that have been detected with the elapse of time in the slide operation.

The correspondence between the in-plane position and capacitance detected by the touch panel 4a, the touch operation, the slide operation, the first operation, and the second operation is generally described with reference to FIG. 31 to FIG. 34. FIG. 31 is a graph illustrating the changes of the capacitance and the movement amount of the in-plane position detected in the touch operation. FIG. 32 is a graph illustrating the changes of the capacitance and the movement amount of the in-plane position detected in the slide operation. FIG. 33 is a graph illustrating the changes of the capacitance and the movement amount of the in-plane position detected in the first operation. FIG. 34 is a graph illustrating the changes of the capacitance and the movement amount of the in-plane position detected in the second operation. Each of the drawings is separated into an upper graph and a lower graph. The upper graph and the lower graph indicate corresponding times by connecting the elapse of time with dashed-dotted lines. The upper graph represents time on the horizontal axis, and represents the movement amount of the in-plane position on the vertical axis. The movement amount indicates the amount of movement from the in-plane position which has been detected for the first time. The lower graph represents time on the horizontal axis, and represents the value of capacitance detected in the touch panel 4a on the vertical axis. When the value of capacitance is higher, the height of the detection object from the detection plane is smaller. Values 1.0 pF and 0.2 pF indicated on the vertical axis in the lower graph are examples. For example, the touch panel 4a according to the present embodiment detects a capacitance of 1.0 pF when the detection object point is in contact with the detection plane. It is considered that this touch panel 4a cannot correctly detect a capacitance of 0.2 pF or less due to the influence of, for example, noise. Dotted line portions in the graphs of FIG. 31 to FIG. 34 indicate the changes of the capacitance and the movement amount of the in-plane position that are detected if a capacitance of 0.2 pF or less can be correctly detected.

The movement amount of the in-plane position and the capacitance detected in the touch operation are described with reference to FIG. 31. In the touch operation, the detection object point first perpendicularly comes closer to one point in the detection plane, and then perpendicularly moves away from this point. A detection result of such a touch operation is as shown in FIG. 31. That is, in the upper graph of FIG. 31, the movement amount of the in-plane position of the detection object point does not change with time. On the other hand, in the lower graph of FIG. 31, the value of capacitance increases and then decreases in the same time interval as that in the upper graph. When such a movement amount of the in-plane position and capacitance are detected, it can be determined from these results that the touch operation has been performed.

The movement amount of the in-plane position and the capacitance detected in the slide operation are described with reference to FIG. 32. In the slide operation, the detection object that is, for example, a finger slides in the detection plane. A detection result of such a slide operation is as shown in FIG. 32. That is, in the upper graph of FIG. 32, the movement amount of the in-plane position of the detection object point increases with the elapse of time. That is, the in-plane position changes. On the other hand, in the lower graph of FIG. 32, the value of capacitance takes a constant value in a time zone in which the movement amount of the in-plane position of the detection object point changes in the upper graph. When such a movement amount of the in-plane position and capacitance are detected, it can be determined from these results that the slide operation has been performed.

The movement amount of the in-plane position and the capacitance detected in the first operation are described with reference to FIG. 33. In the first operation, the detection object moves in a direction oblique to the detection plane. A detection result of such a first operation is as shown in FIG. 33. That is, in the upper graph of FIG. 33, the movement amount of the in-plane position of the detection object increases with the elapse of time. That is, the in-plane position changes. On the other hand, in the lower graph of FIG. 33, the value of capacitance decreases in a time zone in which the in-plane position of the detection object point changes in the upper graph. When such a movement amount of the in-plane position and capacitance are detected, it can be determined from these results that the first operation has been performed.

The movement amount of the in-plane position and the capacitance detected in the second operation are described with reference to FIG. 34. In the second operation, the detection object repeats the first operation. A detection result of such a second operation is as shown in FIG. 34. That is, the movement amount of the in-plane position repeats a change similar to the change of the movement amount of the in-plane position in the first operation. The capacitance repeats a change similar to the change of capacitance in the first operation. When such a movement amount of the in-plane position and capacitance are detected, it can be determined from these results that the second operation has been performed.

A solid line G1 in FIG. 34 corresponds to the second operation which moves the detection object in a large way in the vicinity of the touch panel 4a as in the second operation indicated by an orbit O1 in FIG. 30. A broken line G2 in FIG. 34 corresponds to the second operation which moves the detection object in a small way as in the second operation indicated by an orbit O2 in FIG. 30. The second operations indicated by the solid line G1 and the broken line G2 can be determined to be different operations on the basis of signals output from the touch panel 4a.

Next, FIG. 31 showing the touch operation and FIG. 32 showing the slide operation are compared. In the upper graph of FIG. 31, the detected movement amount of the in-plane position does not change with time. In contrast, in the upper graph of FIG. 32, the detected movement amount of the in-plane position changes. The lower graph of FIG. 31 and the lower graph of FIG. 32 show similar changes in that the value of capacitance increases and decreases. Thus, the touch operation and the slide operation can be determined to be different operations on the basis of signals regarding the movement amounts of the in-plane position output from the touch panel 4a.

Next, FIG. 32 showing the slide operation and FIG. 33 showing the first operation are compared. The upper graph of FIG. 32 showing the slide operation and the upper graph of FIG. 33 show similar changes in that the detected movement amount of the in-plane position changes with time. However, in FIG. 32, the value of capacitance maintains a constant value as in the lower graph when the movement amount of the in-plane position changes. In contrast, in FIG. 33, the value of capacitance increases and decreases in a curve as in the lower graph when the movement amount of the in-plane position changes. Therefore, the slide operation and the first operation show different changes in capacitance. Thus, the slide operation and the first operation can be determined to be different operations on the basis of capacitance signals output from the touch panel 4a.

Next, FIG. 31 showing the touch operation and FIG. 33 showing the first operation are compared. In the upper graph of FIG. 31, the detected movement amount of the in-plane position does not change with time. In contrast, in the upper graph of FIG. 33, the detected movement amount of the in-plane position changes. The lower graph of FIG. 31 and the lower graph of FIG. 33 show similar changes in that the value of capacitance increases and decreases. Consequently, FIG. 31 showing the touch operation and FIG. 33 showing the first operation can be determined to be different operations on the basis of signals regarding the movement amounts of the in-plane position output from the touch panel 4a.

Finally, FIG. 33 and FIG. 34 are compared. Each of the graphs shown in FIG. 34 represents that the signal detected in the first operation is repeatedly detected. Consequently, the touch panel 4a can determine that the touch operation, the slide operation, the first operation, and the second operation are different operations.

(Processing of Portable Device)

Portable device control processing executed by the portable device 1c is described with reference to FIG. 35. FIG. 35 is a flowchart showing an example of the operation of the portable device control processing according to the present embodiment. The portable device 1c starts the portable device control processing, for example, when electric power is applied.

In step S601, the control unit 7 determines whether a photography mode is selected. When the photography mode is selected, the processing proceeds to step S602. In step S602, the control unit 7 performs photography mode processing that will be described later. The processing then proceeds to step S604.

When it is determined in step S601 that the photography mode is not selected, the processing proceeds to step S603.

In step S603, the control unit 7 performs reproduction mode processing that will be described later. The processing then proceeds to step S604.

In step S604, the control unit 7 determines whether to end the portable device control processing. When the portable device control processing is not to be ended, the processing returns to step S601. When the portable device control processing is to be ended, the portable device control processing is ended.

The operation associated with the photography mode processing is described with reference to FIG. 36. In step S701, the control unit 7 causes the imaging unit 2 to perform photography to acquire image data for a live-view image. The control unit 7 causes the display unit 3 to display the live-view image acquired by the imaging unit 2.

In step S702, the control unit 7 determines whether there has been a photography operation on the basis of a signal output from the operation unit 5 including the release switch. When there has been a photography operation, the processing proceeds to step S703. For example, when the release switch is pressed, the processing proceeds to step S703. In step S703, the control unit 7 causes the imaging unit 2 to perform a photography operation to acquire image data. The image data acquired by the photography operation is subjected to image processing and then recorded in the recording unit 6.

In step S704, the control unit 7 causes the display unit 3 to display an image based on the image data acquired by the imaging unit 2 for a predetermined length of time (rec-view display). The photography mode processing then ends, and the processing returns to the portable device control processing.

Figure 37:
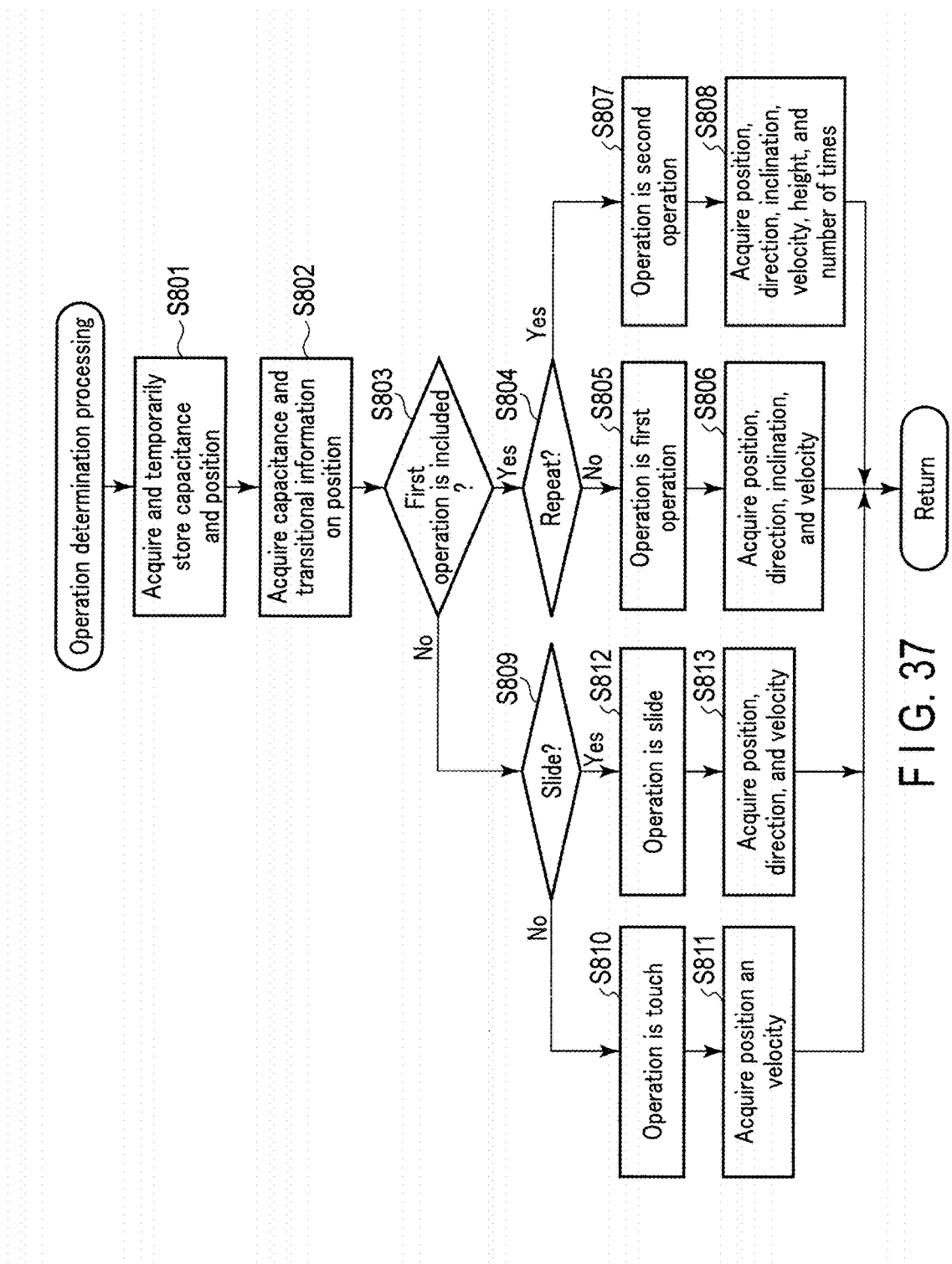
FIG. 37 is a flowchart showing an overview of an example of operation determination processing according to the fifth embodiment.

When it is determined in step S702 that there has been no photography operation, the processing proceeds to step S705. In step S705, the control unit 7 performs operation determination processing. The operation associated with the operation determination processing is described with reference to FIG. 37.

In step S801, the control unit 7 acquires the in-plane position and the value of capacitance from the touch panel 4a, and records the in-plane position and the value of capacitance in the recording unit 6. The processing then proceeds to step S802.

In step S802, the control unit 7 acquires, from the recording unit 6, the changes, with time, of the in-plane position and the value of capacitance that have been acquired in the previous processing.

In step S803, the control unit 7 determines whether the operation on the touch panel 4a includes the first operation. When the operation on the touch panel 4a includes the first operation, the processing proceeds to step S804. In step S804, the control unit 7 determines whether the operation on the touch panel 4a is the operation that repeats the first operation. When the operation on the touch panel 4a is not the operation that repeats the first operation, the processing proceeds to step S805.

In step S805, the control unit 7 determines that the operation on the touch panel 4a is the first operation. The processing then proceeds to step S806. In step S806, the control unit 7 acquires the position where the first operation has been detected, the direction of the first operation, the inclination of the first operation, and the velocity of the first operation on the basis of the detected change of the in-plane positions and the change of the capacitance at these positions with time. The position of the first operation is, for example, the in-plane position which has been detected for the first time before movement. The direction of the first operation is, for example, the direction in which the detected in-plane position moves. The inclination of the first operation is obtained, for example, when a height change is divided by the change of the in-plane position. The velocity of the first operation is obtained, for example, when the length of a segment drawn by the movement of the detection object point derived from the detected in-plane position and height in the first operation is divided by the movement time in which the detection object moves on the above segment. After the processing in step S806, the operation determination processing ends, and the processing returns to the photography mode processing.

When it is determined in step S804 that the operation on the touch panel 4a is the operation that repeats the first operation, the processing proceeds to step S807. In step S807, the control unit 7 determines that the operation on the touch panel 4a is the second operation. In step S808, the control unit 7 determines and acquires the position where the second operation has been detected, the direction of the second operation, the inclination of the second operation, the velocity of the second operation, the height of the detection object point at the position where the second operation has been detected, and the number of times of the second operation on the basis of the detected change of the in-plane positions and the capacitance at these positions with time. The position where the second operation has been detected, the direction of the second operation, the inclination of the second operation, the velocity of the second operation, and the height of the detection object point at the position where the second operation has been detected are similar to those in the case of the first operation. The number of times of the second operation is acquired by counting the number of repetitions. After the processing in step S808, the operation determination processing ends, and the processing returns to the photography mode processing.

When it is determined in step S803 that the operation on the touch panel 4a does not include the first operation, the processing proceeds to step S809. In step S809, the control unit 7 determines whether the operation on the touch panel 4a is the slide operation. When the operation on the touch panel 4a is not the slide operation, the processing proceeds to step S810.

In step S810, the control unit 7 determines that the operation on the touch panel 4a is the touch operation. In step S811, the control unit 7 acquires the position where the touch operation has been detected, and the velocity of the touch operation on the basis of the detected in-plane positions and capacitance. The velocity of the touch operation is the velocity at which the detection object point is brought away from the touch panel 4a. That is, the velocity of the touch operation is the value obtained, for example, when the distance at which the detection object point moves from the smallest height of the detection object point to the greatest height of the detection object point is divided by the movement time. The velocity of the touch operation may be the velocity at which the detection object is brought closer to the detection plane. The operation determination processing then ends, and the processing returns to the photography mode processing.

When it is determined in step S809 that the operation on the touch panel 4a is the slide operation, the processing proceeds to step S812. In step S812, the control unit 7 determines that the operation on the touch panel 4a is the slide operation. In step S813, the control unit 7 acquires the detected position associated with the slide operation, the direction of the slide operation, and the velocity of the slide operation on the basis of the detected in-plane positions and the change of capacitance. The velocity of the slide operation is a value obtained, for example, when the length of a segment drawn by the movement of the detection object point which has slid on the detection plane is divided by the movement time of the slide operation. The operation determination processing then ends, and the processing returns to the photography mode processing.

Figure 36:
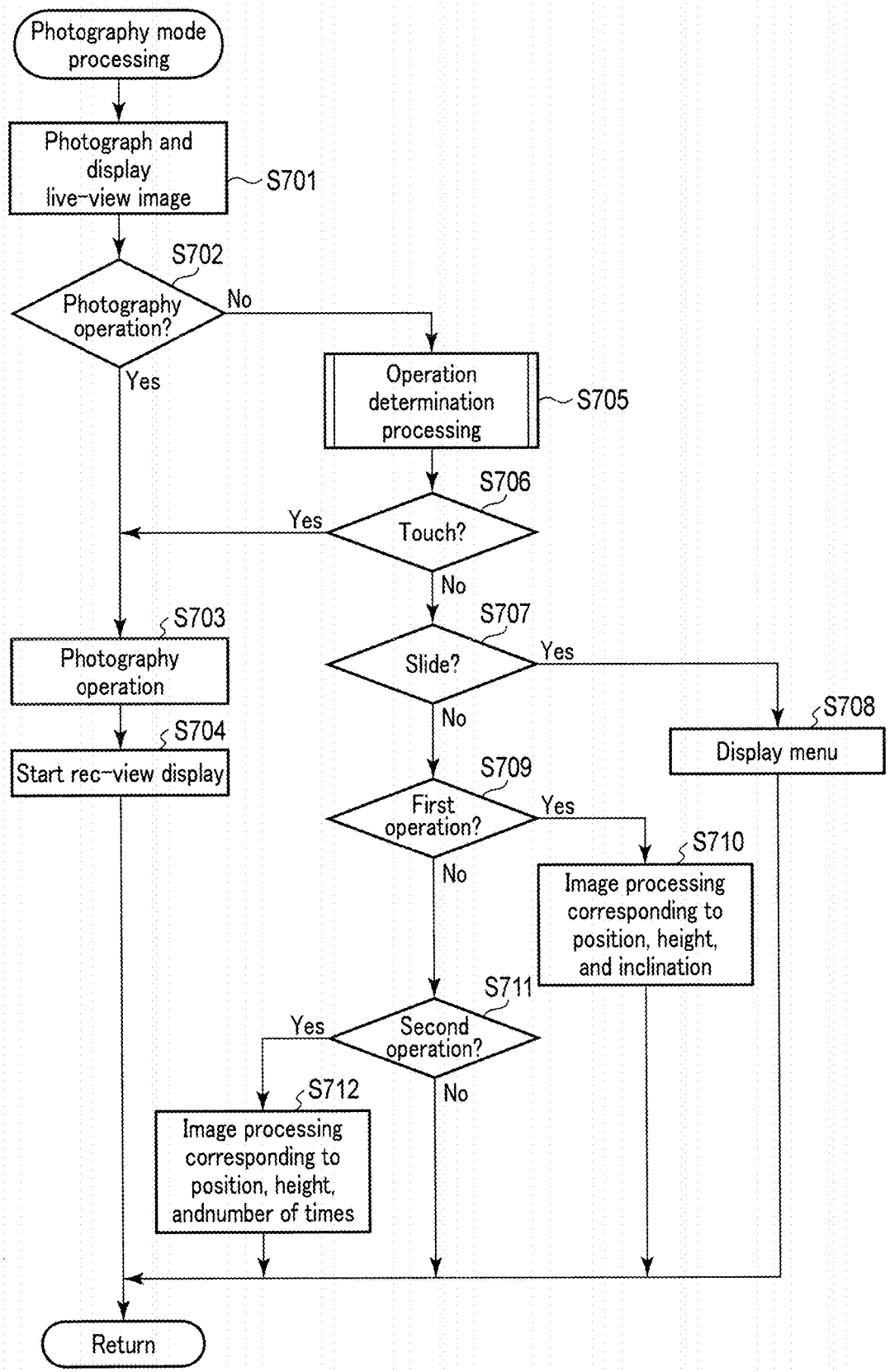
FIG. 36 is a flowchart showing an overview of an example of photography mode processing according to the fifth embodiment.

Back to FIG. 36, description is continued. After the operation determination processing in step S705, the processing proceeds to step S706. In step S706, the control unit 7 determines whether the operation on the touch panel 4a is the touch operation. When the operation on the touch panel 4a is the touch operation, the processing proceeds to step S703 described above. That is, the control unit 7 determines that a touch release operation has been performed, and performs a photography operation. In the touch release operation, an autofocus operation is performed so that a subject corresponding to the position at which the touch operation has been performed is brought into focus. After the focusing, the portable device 1c performs photography.

When it is determined in step S706 that the operation on the touch panel 4a is not the touch operation, the processing proceeds to step S707. In step S707, the control unit 7 determines whether the operation on the touch panel 4a is the slide operation. When the operation on the touch panel 4a is the slide operation, the processing proceeds to step S708. In step S708, the control unit 7 slide-displays a menu showing, for example, an operational procedure on the display unit 3. The slide-display is shown on the display unit 3 so that, for example, a menu display appears to slide from right to left when a slide operation is performed on the touch panel from right to left. The photography mode processing then ends, and the processing returns to the portable device control processing.

When it is determined in step S707 that the operation on the touch panel 4a is not the slide operation, the processing proceeds to step S709. In step S709, the control unit 7 determines whether the operation on the touch panel 4a is the first operation. When the operation on the touch panel 4a is the first operation, the processing proceeds to step S710. In step S710, the control unit 7 performs image processing corresponding to the position of the detection object point associated with the first operation, the direction of the detection object point associated with the first operation, and the inclination of the detection object point associated with the first operation. The operation determination processing then ends, and the processing returns to the photography mode processing.

An example of the image processing corresponding to the position of the detection object point associated with the first operation, the direction of the detection object point associated with the first operation, and the inclination of the detection object point associated with the first operation is described next. FIG. 38 shows an example of an image which is a target of image processing corresponding to the first operation. This image processing is performed on the image data acquired for the live-view image. Although the image processing is performed on the live-view image displayed by the display unit 3 in the example shown here, the image processing performed by the first operation may be performed on other images such as a rec-view-displayed image or a reproduced image.

FIG. 39 is a diagram illustrating an example of the first operation by the user. As shown in FIG. 39, the user performs the first operation on the touch panel 4a with the right hand while grasping the portable device 1c with the left hand. In this example, the user performs such a first operation as to touch the touch panel 4a in the vicinity of the center of the screen, and bring the finger away from the touch panel while moving the finger in the rightward direction.

FIG. 40 shows an example of an image processing result in the case in which when the first operation shown in FIG. 39 is performed, image processing corresponding to this operation is performed on the image. The portable device 1c applies a gradation of a brightness difference corresponding to the inclination of the first operation to the image data for the live-view image in the direction of the first operation from the start point of the first operation in the touch panel 4a. As a result of the image processing, the live-view image decreases in brightness further in the direction of the first operation. This image processing is an example, and other types of image processing such as various types of filter processing may correspond to the first operation.

Back to FIG. 36, description is continued. When it is determined in step S709 that the operation on the touch panel 4a is not the first operation, the processing proceeds to step S711. In step S711, the control unit 7 determines whether the operation on the touch panel 4a is the second operation. When the operation on the touch panel 4a is the second operation, the processing proceeds to step S712. In step S712, the control unit 7 performs image processing corresponding to the position where the second operation has been detected, the height of the detection object at the position where the second operation has been detected, and the number of times of the second operation. After step S712, the operation determination processing ends, and the processing returns to the photography mode processing. When it is determined in step S711 that the operation on the touch panel 4a is not the second operation, the operation determination processing ends, and the processing returns to the photography mode processing.

An example of the image processing corresponding to the position where the second operation has been detected, the height of the detection object point at the position where the second operation has been detected, and the number of times of the second operation is described. FIG. 41 shows an example of the display of the live-view image in the display unit 3. The image processing is performed on the image data acquired for the live-view image. The portable device 1c may perform this image processing during a different operation to display an image in the display unit 3. For example, the portable device 1c may perform this image processing during the rec-view display.

The portable device 1c decreases the brightness of the image data when the number of times of the second operation is smaller. The portable device 1c also decreases the brightness of the image data when the height of the detection object point from the detection plane during the second operation is smaller. The brightness of the image data is determined in accordance with a set value obtained, for example, when the number of times of the second operation is multiplied by the value associated with the height of the detection object point during the second operation. FIG. 42 shows an example of an image processing result in the case in which the position where the height of the detection object point is the smallest in the second operation corresponds to a face portion in the live-view image. FIG. 42 shows an example of an image processing result in the case in which the above-mentioned set value is low. The control unit 7 performs image processing on the image data for the live-view image so that the brightness of the face portion at the in-plane position where the second operation shown in FIG. 42 is detected will be low.

FIG. 43 shows an example of image processing in the case in which the set value is high. The control unit 7 further decreases the brightness of the face portion selected by the second operation when the set value is high. The face portion shown in FIG. 43 is displayed darker than the face portion shown in FIG. 42. This image processing is an example, and other types of image processing may correspond to the second operation.

Figure 44:
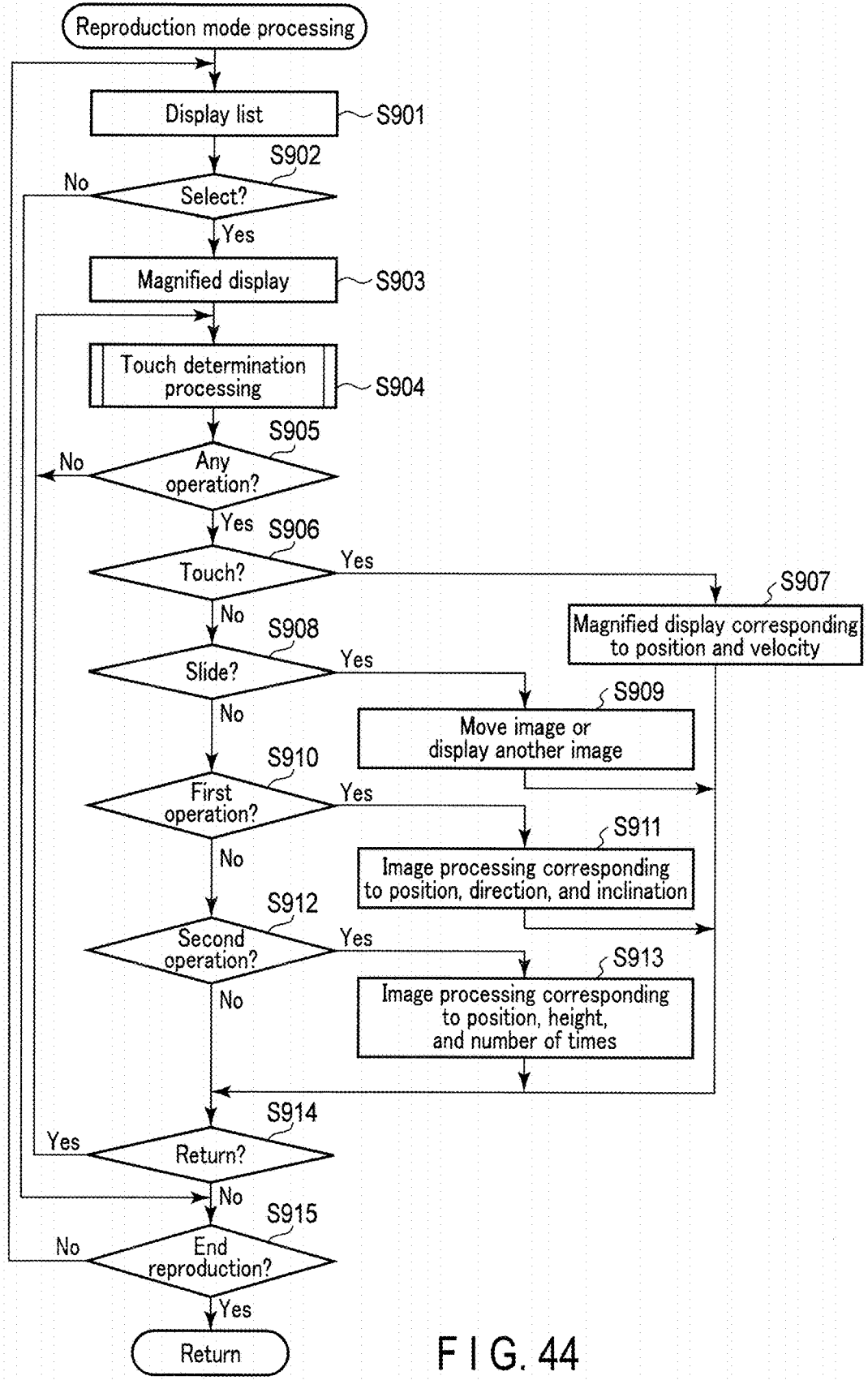
FIG. 44 is a flowchart showing an overview of an example of reproduction mode processing according to the fifth embodiment.

Next, the operation associated with the reproduction mode processing is described with reference to FIG. 44. In step S901, the control unit 7 causes the display unit 3 to display a list of thumbnail images based on the image data recorded in the recording unit 6. The processing then proceeds to step S902.

In step S902, the control unit 7 determines whether a thumbnail image has been selected from the list of thumbnail images displayed by the display unit 3. When no thumbnail image has been selected, the processing proceeds to step S915. Here, a thumbnail image is selected, for example, by a touch operation on the touch panel 4a.

When it is determined in step S902 that a thumbnail image has been selected, the processing proceeds to step S903. In step S903, the control unit 7 causes the display unit 3 to display the image selected by the operation in a magnified form. In step S904, the control unit 7 performs the touch determination processing described above. The processing then proceeds to step S905.

In step S905, the control unit 7 determines whether the touch panel 4a has been operated on the basis of a signal output from the touch panel 4a. When the touch panel 4a has not been operated, the processing returns to step S904. In contrast, when the touch panel 4a has been operated, the processing proceeds to step S906.

In step S906, the control unit 7 determines whether the operation is the touch operation. When the operation is the touch operation, the processing proceeds to step S907. In step S907, the control unit 7 magnifies the image displayed by the display unit 3 around the in-plane position of the touch operation so that the magnification factor may be higher when the velocity of the touch operation is higher. The processing then proceeds to step S914.

When it is determined in step S906 that the operation on the touch panel 4a is not the touch operation, the processing proceeds to step S908. In step S908, the control unit 7 determines whether the operation on the touch panel 4a is the slide operation. When the operation on the touch panel 4a is the slide operation, the processing proceeds to step S909.

In step S909, the control unit 7 moves the image displayed by the display unit 3 faster in the direction of the slide operation when the velocity of the slide operation is higher. Alternatively, the control unit 7 may display another image after moving the image displayed by the display unit 3 in response to the slide operation. The processing then proceeds to step S914.

When it is determined in step S908 that the operation on the touch panel 4a is not the slide operation, the processing proceeds to step S910. In step S910, the control unit 7 determines whether the operation on the touch panel 4a is the first operation. When the operation on the touch panel 4a is the first operation, the processing proceeds to step S911.

In step S911, the control unit 7 subjects the image displayed by the display unit 3 to image processing corresponding to the position where the first operation has been detected, the direction of the first operation, and the inclination of the first operation. This image processing is similar to the image processing described with reference to FIG. 38 to FIG. 40 and is therefore not described. The processing then proceeds to step S914.

When it is determined in step S910 that the operation on the touch panel 4a is not the slide operation, the processing proceeds to step S912. In step S912, the control unit 7 determines whether the operation on the touch panel 4a is the second operation. When the operation on the touch panel 4a is the second operation, the processing proceeds to step S913.

In step S913, the control unit 7 subjects the image displayed by the display unit 3 to image processing corresponding to the position where the second operation has been detected, the height of the detection object point at the position where the second operation has been detected, and the number of times of the second operation. This image processing is similar to the image processing described with reference to FIG. 41 to FIG. 43 and is therefore not described. The processing then proceeds to step S914.

When it is determined in step S912 that the operation on the touch panel 4a is not the second operation, that is, when it is determined that the above operation is not the touch operation, the slide operation, the first operation, or the second operation, the processing proceeds to step S914.

In step S914, the control unit 7 determines whether to return the processing to step S904. When it is determined to return the processing, the processing returns to step S904. For example, when a detection object point is detected after the detection object point which has been determined to be the first operation from the user's operation, the control unit 7 again returns the processing to the touch determination processing in step S904, and then determines whether there has been any operation following the first operation.

When it is determined in step S914 not to return the processing to step S904, the processing proceeds to step S915. In step S915, the control unit 7 determines whether to end the reproduction mode processing. When the reproduction mode processing is not to be ended, the processing returns to step S901. In contrast, when the reproduction mode processing is to be ended, the reproduction mode processing ends, and the processing returns to the portable device control processing. For example, when an icon indicating "return" displayed by the display unit 3 is touched, the present processing ends, and the processing returns to the portable device control processing.

In this way, in the portable device 1c according to the present embodiment, the touch panel 4a detects the height of the detection object point from the detection plane and the in-plane position. On the basis of the detected height and in-plane position, the operation determination unit 77 outputs operational information including the changes of the height and in-plane position with time. Thus, the touch panel 4a and the operation determination unit 77 function as an operation device which outputs the operational information that utilizes the height of the detection object point. In the present embodiment, it is possible to detect not only the touch operation and the slide operation that are detected by conventional touch panels, but also the first operation and the second operation. It is also possible to acquire information such as the velocity in the height direction and the inclination in the height direction. This operation device can determine the operation that utilizes the height of the detection object point, and can therefore determine more operations and output operational information.

The portable device 1c according to the present embodiment comprising the above operation device acquires, from the operation device, operational information including the changes, with time, of the height of the detection object point viewed from the detection plane of the touch panel 4a and the in-plane position of the detection object point in the detection plane of the touch panel 4a, and performs processing adapted to the operational information. Therefore, this portable device 1c can perform processing adapted to more kinds of operations than when operational information acquired by conventional touch panels is used.

The operational information acquired from the above operation device can also be used in an image processing apparatus which performs image processing in accordance with the operational information. This operational information may also be used in other apparatuses.

Other Embodiments

The technique according to the present invention is not exclusively applicable to a portable device such as a digital camera. For example, the present technique is also applicable to digital single-lens reflex cameras, digital cameras to which accessories can be attached, digital video cameras, mobile phones having an imaging function, and electronic devices such as smartphones or tablet type portable devices. These devices do not always need to include the imaging function. The present technique can also be used in a device which processes, for example, an externally acquired image. The present technique is also applicable to, for example, a device which performs display, such as an electronic book. For example, the present technique can be used to extract a necessary part of an electronic book or to perform underlining. The present technique can also be used in a device for use in presentations as a new input method for various handy terminals; for example, to extract an important part or to apply a straight arrow or draw attention. The present technique can also be used not only in portable devices but also in, for example, stationary devices. The present technique can be utilized in, for example, an industrial device for conducting observations and inspections, a microscopic system, and a medical device. The present technique is not exclusively applied to the operation for images. The present technique can be used in operation devices including touch panels in various information processing apparatuses. For example, the present technique can also be used in control panels to control the operations of various devices. For example, the present technique is also applicable to a controller of an industrial robot or to an input panel of an automatic teller machine. Thus, the present technique can also be used in operation devices of various information processing apparatuses. In each operation device, for example, the line drawing operation, the first operation, and the second operation can be associated with various functions.

Programs to be executed by the portable device according to the present invention are recorded and provided as installable or executable file data in a computer-readable recording medium, such as a CD-ROM, a flexible disk (FD), a CD-R, a digital versatile disk (DVD), a USB medium, or a flash memory.

The programs to be executed by the portable device according to the present invention may be configured to be stored in a computer connected to a network such as the Internet and provided by being downloaded via the network. The programs to be executed by the portable device according to the present invention may also be configured to be provided or distributed via a network such as the Internet.

Although expressions such as "first", "then", and "next" are used to clearly show the context of processing in steps in the explanation of the flowcharts in the present specification, the sequence of the processing necessary to carry out the present invention is not determined uniquely by these expressions. That is, the sequence of the processing in the flowcharts shown in the present specification can be changed within the range of consistency.

Thus, various embodiments that are not described here may fall within the present invention, and various modifications in design can be made within the technical concept specified by the scope of the claims.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An operation device comprising:
a touch panel which detects a contact position where an external object has contacted, and outputs a result of detection;
a detection circuit which detects a trace from a start position where the external object has started to contact the touch panel at a first time to an end position where the external object has come away from the touch panel at a second time later than the first time based on the result of the detection output by the touch panel, and detects a change of an area or a width of contact of the external object with the touch panel at each of a plurality of positions along the trace from the start position to the end position with respect to elapsed time, wherein the area or width of contact of the external object with the touch panel at any of the plurality of positions along the trace from the start position to the end position is independent of the length of the trace; and
a line drawing determination unit which determines that a slide operation has been performed when a change of a position of contact of the external object with the touch panel is smaller than a predetermined value with respect to at least one of
(A) the change of the area with respect to elapsed time at the start position,
(B) the change of the area with respect to elapsed time at the end position,
(C) the change in the width with respect to elapsed time at the start position, or
(D) the change of the width with respect to elapsed time at the end position, and determines that a line drawing operation to divide the touch panel by a straight line has been performed when the change of the position of contact of the external object with the touch panel is larger than the predetermined value with respect to at least one of
(A) the change of the area with respect to elapsed time at the start position,
(B) the change of the area with respect to elapsed time at the end position,
(C) the change in the width with respect to elapsed time at the start position, or
(D) the change of the width with respect to elapsed time at the end position, based on the trace and the change of the area or the width with respect to elapsed time detected by the detection circuit.

2. The operation device according to claim 1, wherein the line drawing determination unit determines that the line drawing operation has been performed when the detection circuit further detects that the external object has moved from one end to the other end in the touch panel.

3. The operation device according to claim 1, wherein
the detection circuit is configured to detect the width of the contact of the external object based on the result of the detection output by the touch panel, and
the line drawing determination unit determines that the line drawing operation has been performed when the width detected by the detection circuit gradually decreases from the start position to the end position.

4. An information processing apparatus comprising:
the operation device according to claim 1;
a display unit over which the touch panel is provided and which displays an image;
a closed region determination unit which determines whether a closed region has been formed in a display region of the display unit based on results of determinations by the line drawing determination unit; and
an image processing unit which trims a region corresponding to the closed region from the image to generate trimmed image data when the closed region determination unit determines that the closed region has been formed.

5. The information processing apparatus according to claim 4, further comprising:
an imaging unit which images a subject and generates image data regarding the subject;
an imaging control unit which controls a photography operation of the imaging unit; and
a display control unit which causes the display unit to display an image corresponding to the image data generated by the imaging unit,
wherein the imaging control unit causes the imaging unit to perform the photography operation when the closed region determination unit determines that the closed region has been formed, and
the image processing unit trims the closed region in the image corresponding to the image data generated by the imaging unit to generate trimmed image data.

6. The information processing apparatus according to claim 5, wherein the display control unit causes the display unit to display the trace described by the line drawing operation.

7. The operation device according to claim 1, wherein the line drawing determination unit determines a line drawing operation to divide the touch panel by a straight line has been performed when the trace moves to an edge of the touch panel.

8. The operation device according to claim 1, wherein the line drawing determination unit determines a line drawing operation to divide the touch panel by a straight line has been performed when both the trace moves to an edge of the touch panel and a velocity of a second half of the trace is at least a second predetermined value.

9. An operation receiving method for an information processing apparatus comprising an operation device, the operation device comprising a touch panel which detects a contact position where an external object has contacted and then outputs a result of detection, the operation receiving method comprising:
detecting a trace from a start position where the external object has started to contact the touch panel at a first time to an end position where the external object has come away from the touch panel at a second time later than the first time based on the result of the detection output by the touch panel;
detecting a change of an area or a width of contact of the external object with the touch panel at each of a plurality of positions along the trace from the start position to the end position with respect to elapsed time, wherein the area or width of contact of the external object with the touch panel at any of the plurality of positions along the trace from the start position to the end position is independent of the length of the trace; and
determining that a slide operation has been performed when a change of a position of contact of the external object with the touch panel is smaller than a predetermined value with respect to at least one of
(A) the change of the area with respect to elapsed time at the start position,
(B) the change of the area with respect to elapsed time at the end position,
(C) the change in the width with respect to elapsed time at the start position, or
(D) the change of the width with respect to elapsed time at the end position, and determining that a line drawing operation to divide the touch panel by a straight line has been performed when the change of the position of contact of the external object with the touch panel is larger than the predetermined value with respect to at least one of
(A) the change of the area with respect to elapsed time at the start position,
(B) the change of the area with respect to elapsed time at the end position,
(C) the change in the width with respect to elapsed time at the start position, or
(D) the change of the width with respect to elapsed time at the end position, based on the trace and the change of the area or the width with respect to time.

10. The operation receiving method according to claim 9, further determining that a line drawing operation to divide the touch panel by a straight line has been performed when the trace moves to an edge of the touch panel.

11. The operation receiving method according to claim 9, further determining that a line drawing operation to divide the touch panel by a straight line has been performed when both the trace moves to an edge of the touch panel and a velocity of a second half of the trace is at least a second predetermined value.

12. An operation device comprising:
a touch panel which detects a contact position where an external object has contacted, and outputs a result of detection;
a detection circuit which detects a trace from a start position where the external object has started to contact the touch panel at a first time to an end position where the external object has come away from the touch panel at a second time later than the first time based on the result of the detection output by the touch panel, and detects a change of an area or a width of contact of the external object with the touch panel at each of a plurality of positions along the trace from the start position to the end position with respect to elapsed time, wherein the area or width of contact of the external object with the touch panel at any of the plurality of positions along the trace from the start position to the end position is independent of the length of the trace; and a line drawing determination unit which
- (1) determines whether or not a width of contact of the external object with the touch panel during the trace has a first characteristic, and which further
- (2A) determines that a line drawing operation to divide the touch panel by a straight line has been performed responsive to a determination that a width of contact of the external object with the touch panel during the trace has the first characteristic, or otherwise further
- (2B) determines that a slide operation has been performed responsive to a determination that a width of contact of the external object with the touch panel during the trace does not have the first characteristic.

13. The operation device according to claim 12, wherein the first characteristic is that the touch width has changed over the trace.

14. The operation device according to claim 12, wherein the first characteristic is that the touch is less than or equal to a predetermined value.

15. The operation device according to claim 12, wherein the line drawing determination unit determines a line drawing operation to divide the touch panel by a straight line has been performed when the trace moves to an edge of the touch panel.

16. The operation device according to claim 12, wherein the line drawing determination unit determines a line drawing operation to divide the touch panel by a straight line has been performed when both the trace moves to an edge of the touch panel and a velocity of a second half of the trace is at least a second predetermined value.

17. A method for use with a touch panel, the method comprising:

- detecting a contact position where an external object has contacted the touch panel and outputting a result of the detection;
- detecting a trace from a start position where the external object has started to contact the touch panel at a first time to an end position where the external object has come away from the touch panel at a second time later than the first time based on the result of the detection output by the touch panel, and detecting a change of an area or a width of contact of the external object with the touch panel at each of a plurality of positions along the trace from the start position to the end position with respect to elapsed time, wherein the area or width of contact of the external object with the touch panel at any of the plurality of positions along the trace from the start position to the end position is independent of the length of the trace;
- determining whether or not a width of contact of the external object with the touch panel during the trace has a first characteristic; and
  - (A) determining that a line drawing operation to divide the touch panel by a straight line has been performed responsive to a determination that a width of contact of the external object with the touch panel during the trace has the first characteristic, or otherwise (B) determining that a slide operation has been performed responsive to a determination that a width of contact of the external object with the touch panel during the trace does not have the first characteristic.

* * * * *